United States Patent [19]

Stuart

[11] Patent Number: 5,527,001
[45] Date of Patent: Jun. 18, 1996

[54] MODULAR COMMUNICATION SATELLITE

[75] Inventor: James R. Stuart, Louisville, Colo.

[73] Assignee: Teledesic Corporation, Kirkland, Wash.

[21] Appl. No.: 75,425

[22] Filed: Jun. 11, 1993

[51] Int. Cl.$^6$ .............................. B64G 1/10; B64G 1/44
[52] U.S. Cl. ..................................... 244/158 R; 244/173
[58] Field of Search ............................... 244/173, 158 R, 244/164, 169, 171

[56] References Cited

U.S. PATENT DOCUMENTS

| | | |
|---|---|---|
| 4,353,071 | 10/1982 | Bernstein et al. . |
| 4,854,526 | 8/1989 | Rochefort ............................ 244/158 R |
| 5,003,514 | 3/1991 | Cotilla et al. . |
| 5,044,579 | 9/1991 | Bernasconi et al. ................. 244/158 R |
| 5,052,640 | 10/1991 | Chang ..................................... 244/173 |
| 5,199,672 | 4/1993 | King et al. ........................... 244/158 R |

FOREIGN PATENT DOCUMENTS

| | | |
|---|---|---|
| US/88/02365 | 2/1989 | WIPO . |
| WO89/014372 | 2/1989 | WIPO . |
| WO93/09578 | 5/1993 | WIPO . |

OTHER PUBLICATIONS

"Thermionic Energy Conversion & Metallic–Fluid . . . ," by James F. Morris, pp. 271–282.
"Thermal Control," by Agrawal, published in Design of Geosynchronous Spacecraft, 1986, pp. 266–321.
"Turning a Crate into a Satellite," excerpt re Thermal Controls, by Blonstein, published in The Technology of Space Communications, 1981, pp. 41–44.
"Deployment of an Inflatable Solar Array," advertisement from L'Garde, Inc.

"Ballooning Through Space," by Eugene Rossel et al., published in Technology, pp. 33–35.
Excerpt re Amorphous Silcon on p. 766 in "Proceedings of the 24th Intersociety . . . ," edited by Jackson et al., published in Institute of Electrical & Electronic Engineers, vol. 2, Aug. 6–11, 1989, pp. 765–767.
"Entering the space Arena with Amorphous Silicon Solar Arrays," by Eugene Rossel, p. 5.
AX 1991 IEEE National Radar Conference; "A Space–Fed Phased Array for Surveillance from Space" by Hightower et al.; pp. 41–45.

Primary Examiner—William Grant
Attorney, Agent, or Firm—Anglin & Giaccherini

[57] ABSTRACT

A *Modular Communication Satellite* (10) for a Satellite Communication System is disclosed. The preferred embodiment of the invention includes a foldable, high-gain, electronically steered antenna array (12) that is always pointed toward the Earth (E). The unfolded spacecraft resemble an oblate flower. Polygonal antenna panels (92, 94, 96, 102, 104, & 106) are attached to each other and to a primary bus structure (22) by antenna deployment hinges (90). The upper portion of the satellite (10) incorporates intersatellite antenna arrays (26) of individual intersatellite antennas (28), which are always pointed tangentially to the Earth (E). An Astromast™ boom (32) is mounted between the space facing surface of the primary bus structure (22) and an assembly of solar array storage booms (36). The Astromast™ boom (32) can expand and rotate amorphous silicon solar arrays (38) which are unfurled from within the solar array storage booms (36). The amorphous silicon solar arrays (38) gather solar radiation to provide power the satellite (10), and furnish thermal control for the satellite (10) by shielding it from solar radiation. The satellite is capable of being nested or stacked in a compact arrangement that fits within a payload bay of a launch vehicle (LV).

17 Claims, 16 Drawing Sheets

(NEAR SIDE SPECECRAFT MODULE REMOVED TO EXPOSE DETAIL)

| TRANSMIT | RECEIVE | # ELEMENTS | GAIN (dB) | # ARRAYS |
|---|---|---|---|---|
| ⊕ | ○ | 316 | 31.7 | 10 |
| ⊕ | ⊖ | 320 | 31.7 | 32 |
| ⊕ | ⊖ | 484 | 33.4 | 48 |
| ⊕ | ⊖ | 684 | 35.0 | 48 |
| ⊕ | ⊕ | 2128 | 41.0 | 64 |
|  | ⊕ | 1020 | 38.0 | 68 |

| TRANSMIT | RECEIVE | # ELEMENTS | GAIN (dB) | # ARRAYS |
|---|---|---|---|---|
| ⊕ | ⊙ | 316 | 31.7 | 10 |
| ⊕ | ⊙ | 320 | 31.7 | 32 |
| ⊕ | ⊙ | 484 | 33.4 | 48 |
| ⊕ | ⊕ | 684 | 35.0 | 48 |
| ⊕ | ⊕ | 2128 | 41.0 | 64 |

MODULAR COMMUNICATION SATELLITE

CROSS-REFERENCES TO RELATED PATENT APPLICATIONS

The present patent application is related to the following commonly-owned and commonly-assigned patent applications:

*Satellite Communication System* by Edward F. Tuck et al., filed on Oct. 28, 1991 and assigned U.S. Ser. No. 07/783,754;

*Terrestrial Antennas for Satellite Communication System* by Asu Ram Jha, a Continuation-in-Part application filed on Dec. 2, 1992 and assigned U.S. Ser. No. 07/984,609 and claiming the benefit of priority of a parent application entitled *Terrestrial Antennas for Satellite Communication System* by Asu Ram Jha, filed Nov. 8, 1991 and assigned U.S. Ser. No. 07/790,273, now abandoned;

*Switching Methods for Satellite Communication System* by David Palmer Patterson & Moshe Lerner Liron, filed on Nov. 8, 1991 and assigned U.S. Ser. No. 07/790,805, now abandoned;

*Beam Compensation Methods for Satellite Communication System* by David Palmer Patterson and Mark Alan Sturza, filed on Nov. 8, 1992 and assigned U.S. Ser. No. 07/790,318;

*Spacecraft Antennas & Beam Steering Methods for Satellite Communication System* by Douglas Gene Lockie and Mark Thomson, filed on Oct. 28, 1992 and assigned U.S. Ser. No. 07/967,988 and claiming the benefit of priority of a parent application entitled *Spacecraft Antennas & Beam Steering Methods for Satellite Communication System* by Douglas Gene Lockie, filed on Nov. 8, 1991 and assigned U.S. Ser. No. 07/790,271, now abandoned;

*Spacecraft Designs for Satellite Communication System* by James R. Smart and David P. Patterson, filed on Aug. 18, 1992 and assigned U.S. Ser. No. 07/931,625, now U.S. Pat. No. 5,386,953 and claiming the benefit of priority of a parent application entitled *Spacecraft Designs for Satellite Communication System* by James R. Smart filed on Nov. 8, 1991 and assigned U.S. Ser. No. 07/790,748, now abandoned; and

*Traffic Routing for Satellite Communication System* by Moshe Lerner Liron, filed on Feb. 9, 1993 and assigned U.S. Ser. No. 08/016,204, now abandoned.

The specifications of the patent applications listed above are hereby incorporated by reference.

FIELD OF THE INVENTION

The present invention relates to the field of satellite designs. More particularly, this invention is a part of a constellation of 840 extremely high power and ultra-lightweight spacecraft grouped in sets of 40 equally spaced satellites which circle the globe in 21 low Earth orbits. The satellites operate in 700 km (435 mile) circular, sun-synchronous orbits which are inclined approximately 98.2 degrees to the equator.

BACKGROUND OF THE INVENTION

Communications satellites operating in Earth orbit were first seriously proposed during the middle of this century. A relatively small portion of current telephone traffic is relayed between ground stations by spacecraft carrying transponders that are located over a fixed portion on the Earth in 22,300 mile geosynchronous orbits. Over the past few decades, public phone systems have relied primarily on land lines and microwave repeaters to handle call traffic. Cellular networks now provide service which extends previous network capabilities. Customers using hand-held portable phones or carphones are now able to access the conventional, centralized land-based system without using a traditional fixed phone, as long as their transportable terminals are within the range of land-based antenna towers called "cell sites." Even in the United States, these cell sites are not universally prevalent, since market forces restrict cellular service to only the most densely populated urban portions of our country. Since cellular service is available to only a small minority of privileged users in wealthy countries, and is virtually non-existent in lesser developed parts of the world, the operators of traditional phone networks are confronted with serious systemic problems that severely constrain the continued growth of their communications utilities.

A spacecraft design that enables the compact nesting of multiple spacecraft in the same launch vehicle has partially been addressed by Mark G. Rochefort. In International Application Number PCT/US88/02365, Rochefort considered using a substantially cup-shaped configuration for stored spacecraft to allow a large number of identically shaped spacecraft to be stored together in the stowage compartment of a launch vehicle. This approach did not anticipate the large number of antennas necessary for a satellite in a large communications system. Rochefort did not consider the advantage of storing solar arrays near the antenna arrays. He also did not consider unfurling a solar array away from the antenna arrays. Rochefort's stowage of satellites in a cup-shaped manner also unnecessarily exposes the surfaces of a satellite to damage during storage, launch and placement into orbit.

No system that is currently available to the general public is capable of taking advantage of the enormous augmentation of communications capacity that could be achieved if the traditional centralized grid of terrestrial switches, wires, fibers, and microwave repeaters could be completely bypassed. Public phone companies are not presently able to sell continuous global service to their customers who wish to use phones that are not hard-wired to the land-based network. Some commercial spacecraft now in service help to relay some portion of the total call traffic, but all these calls must still pass through the conventional land-based system. The problem of providing an economically feasible network for voice, data, and video which can be used by subscribers all over the world has presented a major challenge to the communications business.

The development of a constellation of reliable, high gain satellites which can communicate directly to terrestrial terminals without routing calls through land-based networks would constitute a major technological advance and would satisfy a long felt need within the electronics and telephone industries.

SUMMARY OF THE INVENTION

A *Modular Communication Satellite* for a Satellite Communication System is disclosed. The preferred embodiment of the invention includes a foldable, high-gain, electronically steered antenna array which is always pointed toward the Earth, and which resembles an oblate flower. A group of polygonal antenna panels are attached to each other and to a primary bus structure by antenna deployment hinges. The upper portion of the satellite incorporates an array of individual intersatellite antennas, which are always pointed tangentially to the Earth and towards the intersatellite antenna arrays of other satellites within the satellite constellation. An Astromast™ boom is mounted between the space-facing surface of the primary bus structure and an assembly of solar array storage booms. The Astromast™ boom can expand and rotate amorphous silicon solar arrays which are unfurled from within the solar array storage booms. The amorphous silicon solar arrays gather solar radiation to provide power the satellite, and also provide thermal control for the satellite by shielding the satellite from solar radiation. The satellite is capable of being nested or stacked in a compact arrangement that fits within a payload bay of a launch vehicle.

An appreciation of other aims and objectives of the present invention and a more complete and comprehensive understanding of this invention may be achieved by studying the following description of a preferred embodiment and by referring to the accompanying drawings.

DETAILED DESCRIPTION OF A PREFERRED EMBODIMENT

Figure 1:
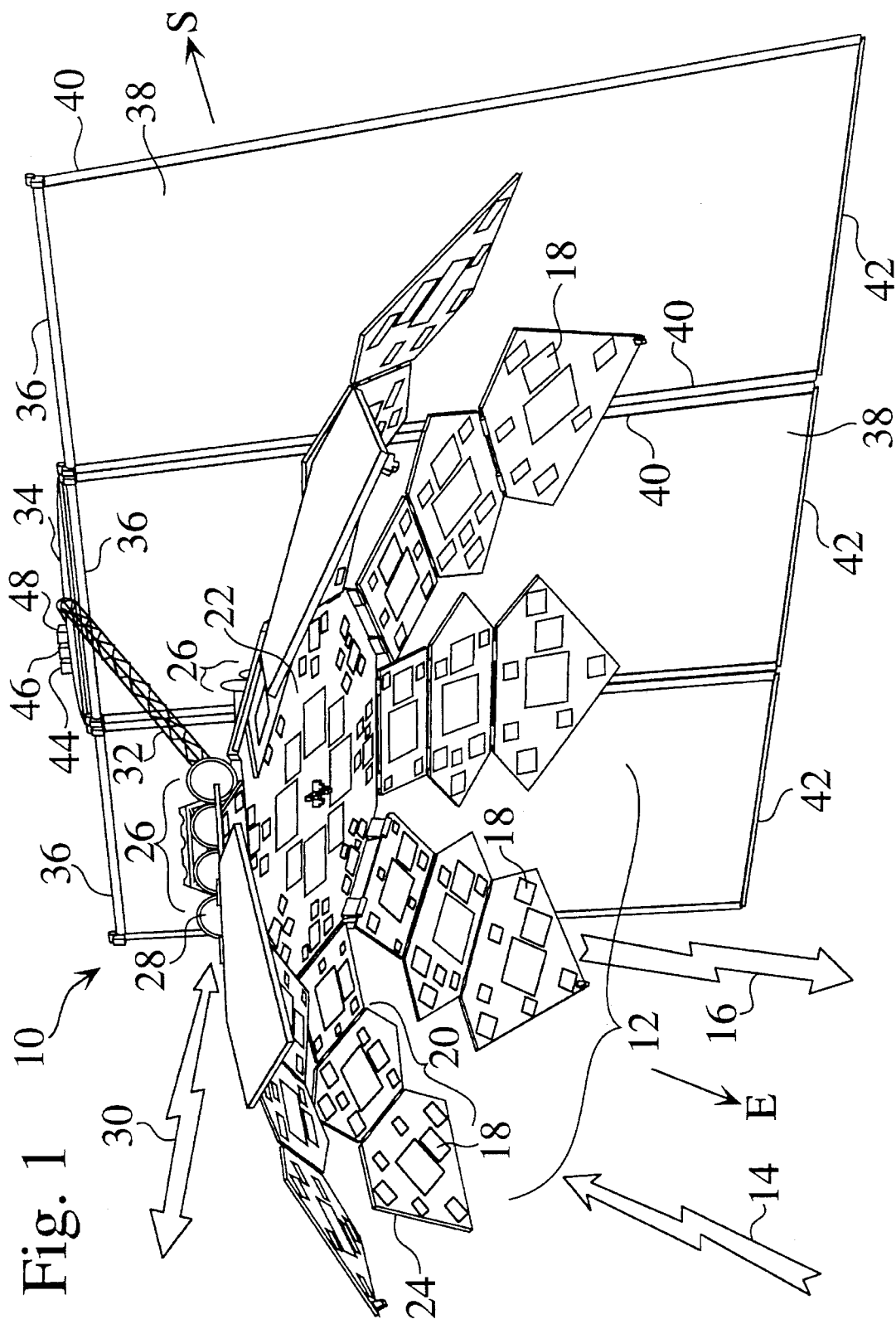
FIG. 1 is an illustration of the Callingsat satellite, as it would appear in its fully opened and deployed position in low Earth orbit. This illustration shows how the present invention would be deployed to provide communications links to Earth and to other Callingsats in its constellation.

FIG. 1 is an illustration of the Callingsat 10 shown as it would appear in its fully opened and deployed position in low Earth orbit. An Earth-facing antenna array 12 is used to provide reception of 30 GHz uplinks 14 and also to provide transmission of 20 GHz downlinks 16. The Earth-facing antenna array 12 comprises individual electronically steered phased-array antennas 18 located on eight mobile, fixed terminal satellite link M/FTSL antenna panel sets 20 and on the Earth-facing surface of the primary bus structure 22. Each M/FTSL antenna panel set 20 has three adjoining antenna facet panels 24. The M/FTSL panels are deployed at angles with respect to the Earth's surface that limit the required steering angle from the satellite to the portion of the Earth surface served by this antenna. Four intersatellite link ISL antenna arrays 26 are located on the space-facing surface of the primary bus structure 22. Four individual ISL antennas 28 make up each of the ISL antenna arrays 26. The ISL antennas 28 are able to receive and to transmit 60 GHz intersatellite links 30. The 60 GHz intersatellite links 30 provide communication among the constellation of Callingsats.

An expandable Astromast™ boom 32 such as that produced by Astro-Spar of Carpenteria, Calif., is mechanically coupled to the primary bus structure 22, and at full extension can reach approximately 12 meters in length. A boom crossmast 34 is mechanically coupled to the far end of the Astromast™ boom 32. A solar array storage boom 36 is attached to the boom crossmast 34. Two more solar array storage booms 36 are coupled to opposite ends of the first solar array storage boom 36. An amorphous silicon solar array 38 extends from each of the solar array storage booms 36. Inflatable booms 40 extend from each end of the solar array storage booms 36, and are attached to the amorphous silicon solar arrays 38. A cantilever boom 42 is attached to the far end of each of the amorphous silicon solar arrays 38, between each pair of inflatable booms 40. Structural support for each of the thin, generally rectangular, amorphous silicon solar arrays 38 is provided by the framework created by each solar array storage boom 36, a pair of inflatable booms 40, and a cantilever boom 42.

Pulse plasma thrusters 44, storage batteries 46, and shunt regulators 48 are attached to the boom crossmast 34. Propulsion for the Callingsat 10 is provided by six pulse plasma thrusters 44, which in this embodiment are produced by Olin RRC. The pulse plasma thrusters 44 provide propulsion to accomplish maneuvers such as orbit insertion, drag make-up, station keeping, and de-orbit that is required at the end of the lifetime of a Callingsat 10. Each of the pulse plasma thrusters 44 is designed to provide 60 kN * sec of thrust. This configuration affords the advantages of redundant propulsion, and also insures reliable service for the lifetime of the satellite 10.

Figure 2:
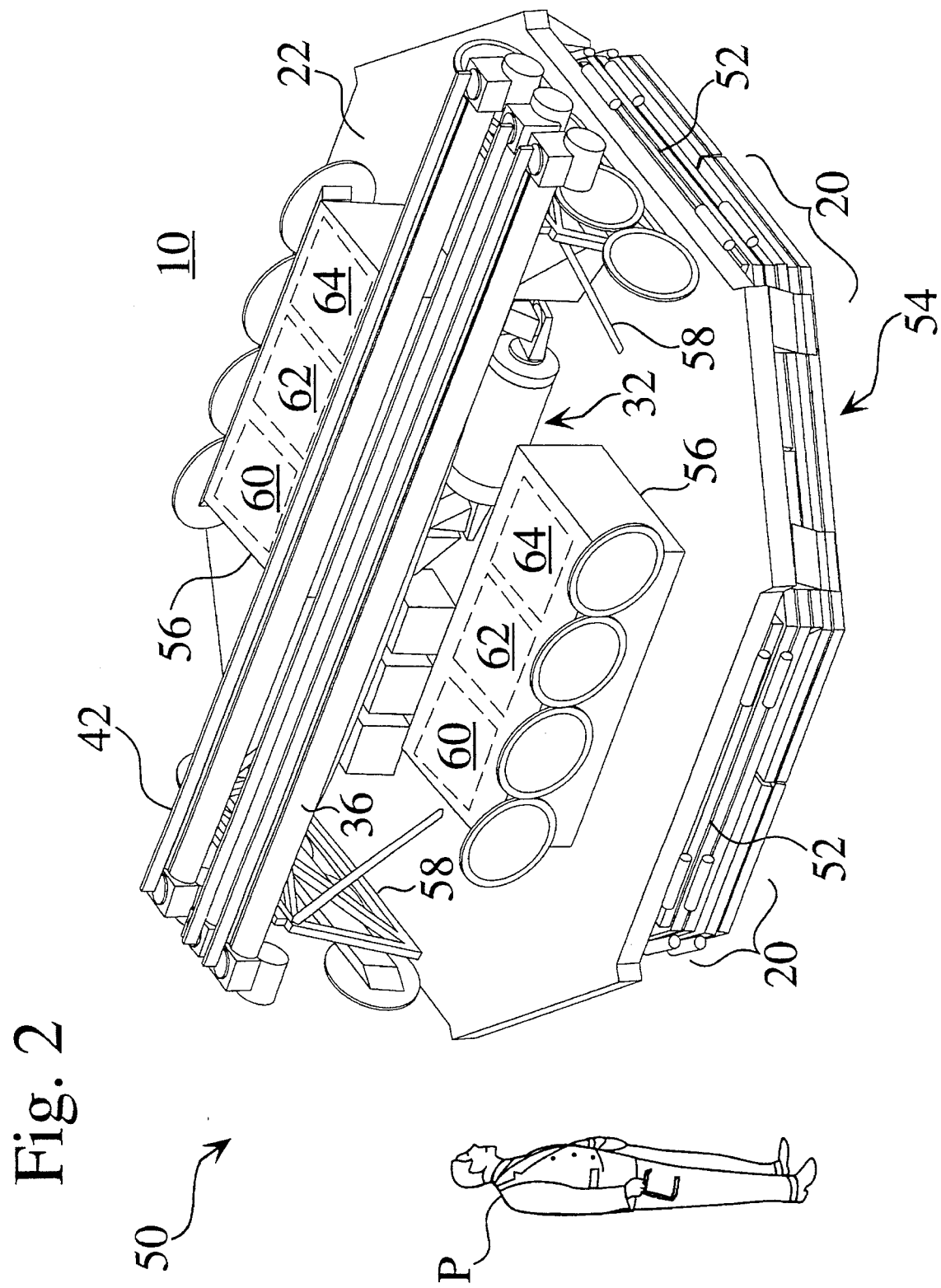
FIG. 2 is a perspective view of the assembled Callingsat, before being launched and deployed into low Earth orbit.

FIG. 2 is a perspective view 50 of the assembled Callingsat 10, before it is launched and deployed in low Earth orbit. Many of the components of the Callingsat 10 are designed to be stored, folded, or manipulated to achieve as small a volume as possible. This design provides an extremely compact structure that can be delivered into space at the lowest cost. Four M/FTSL antenna panel sets 20 located at opposing corners of the primary bus structure 22 are folded inward to become the inner antenna arrays 52. The remaining four M/FTSL antenna panel sets 20 that are also attached to the primary bus structure 22 are also folded inward to become the outer antenna arrays 54.

Two component storage compartments 56 are located on the upper surface of the primary bus structure 22. Two ISL antenna arrays 26 are attached to the exterior of the component storage compartments 56. The amorphous silicon solar arrays 38 and inflatable booms 40 are stored inside their respective solar array storage booms 36, which are folded together and are mounted to the primary bus structure 22 by two modular aluminum solar array attachment structures 58. Two additional ISL antenna arrays 26 are attached to the solar array attachment structures 58. The component storage compartments 56 are used to house much of the required internal systems, such as the command and data handling subsystem 60, the attitude/orbit determination and control subsystem 62, and the communications payload subsystem 64.

Figure 3:
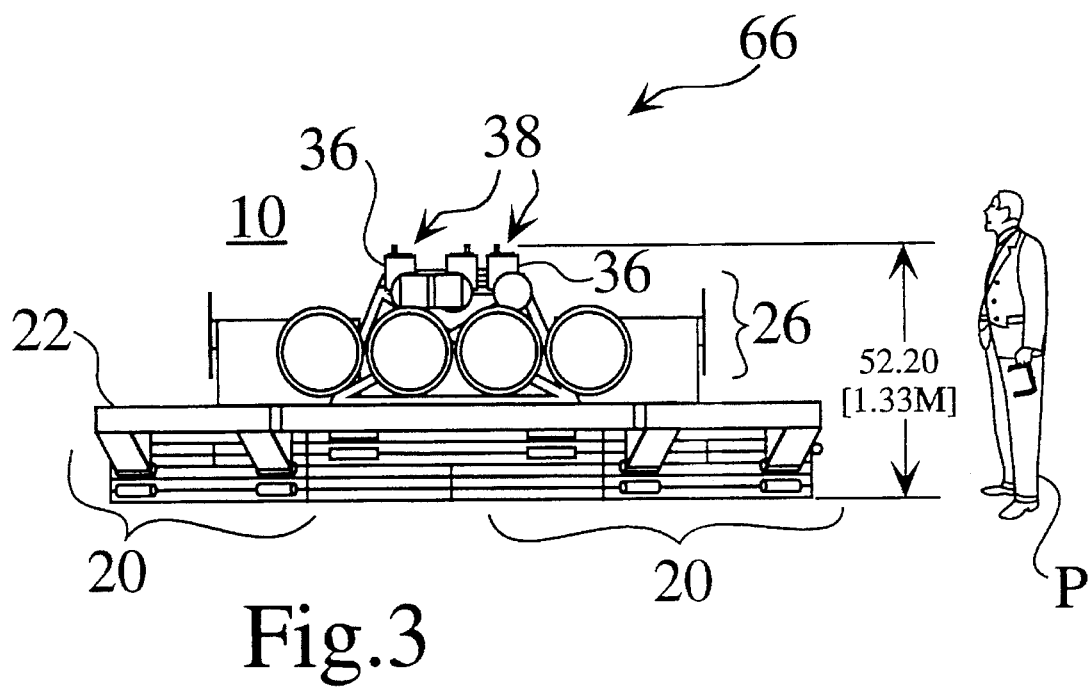
FIG. 3 is a front view of the assembled Callingsat, which shows a lower region in which the folded antenna arrays are located, and an upper region where intersatellite antennas, extension and storage booms, and solar arrays are located.

FIG. 3 provides a front view 66 of the assembled Callingsat 10, which shows how the M/FTSL antenna panel sets 20 are folded underneath the primary bus structure 22. FIG. 3 also illustrates how the amorphous silicon solar arrays 38 are stored effectively within the solar array storage booms 36. The scale of the assembled Callingsat 10 is suggested by a person P standing approximately two meters tall alongside the Callingsat 10.

Figure 4:
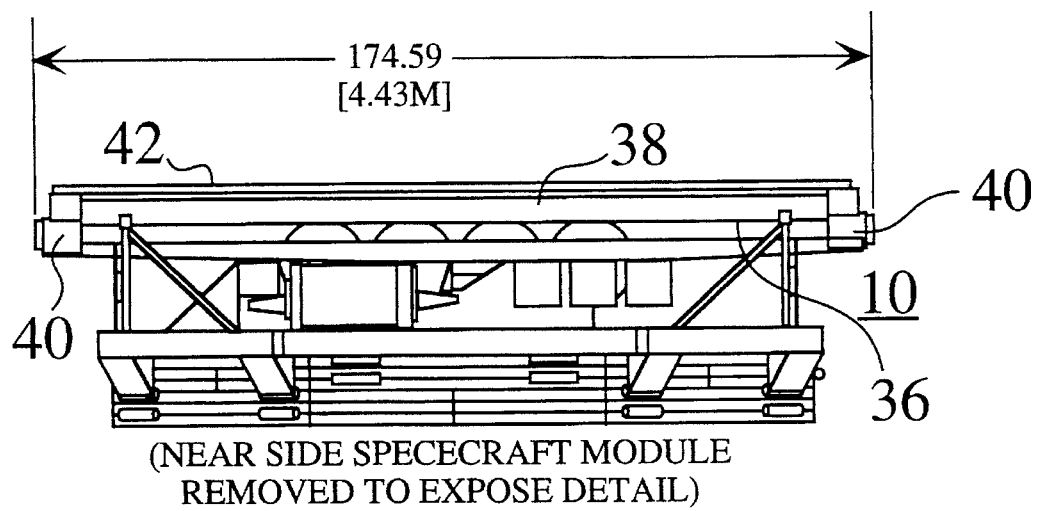
FIG. 4 offers a detailed side view of the assembled Callingsat in its predeployed state. From this view, details of one of the three solar array storage booms can be seen.

FIG. 4 offers a detailed side view 68 of the assembled Callingsat 10. From this view, details of one of the three solar array storage booms 36 can be seen. Cantilever booms 42 extend between both ends of the solar array storage booms 36. Before deployment, the amorphous silicon solar arrays 38 and the inflatable booms 40 are stored within the solar array storage booms 36.

Figure 6:
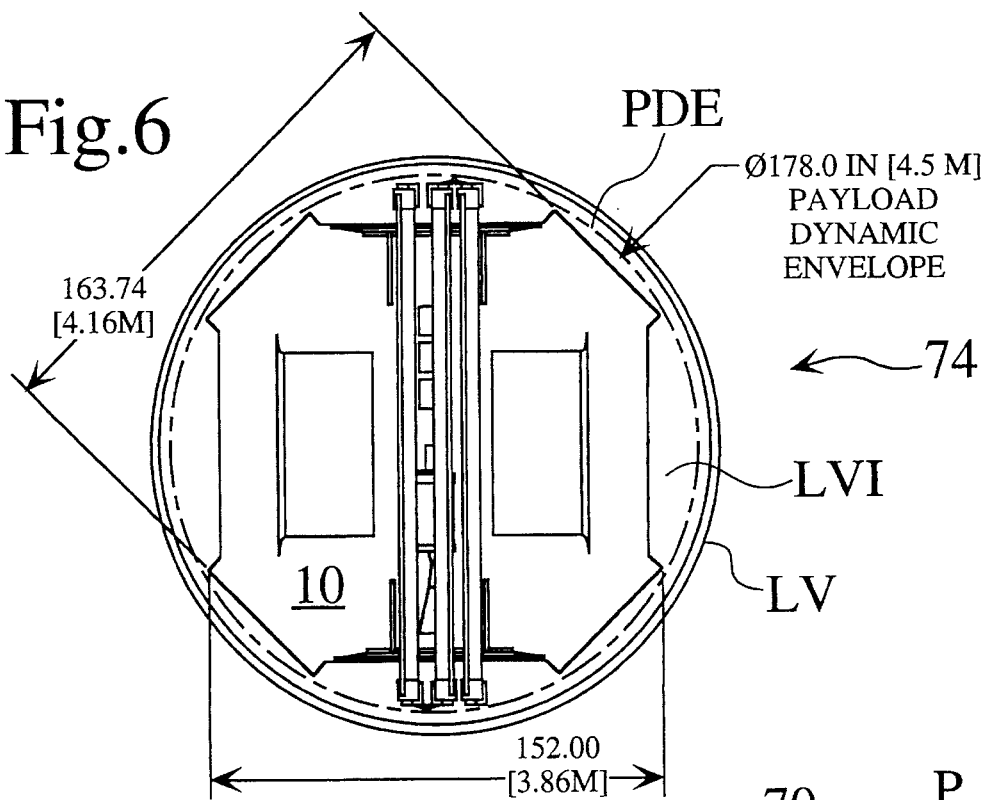
FIG. 6 is a top view of a Callingsat within a launch vehicle.
Figure 5:
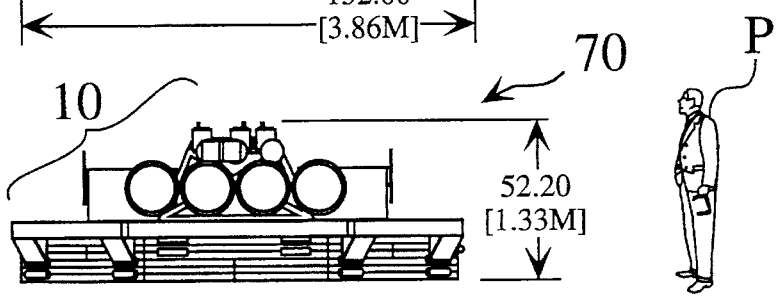
FIG. 5 is a front view of an assembled Callingsat before being placed into a launch vehicle.
Figure 7:
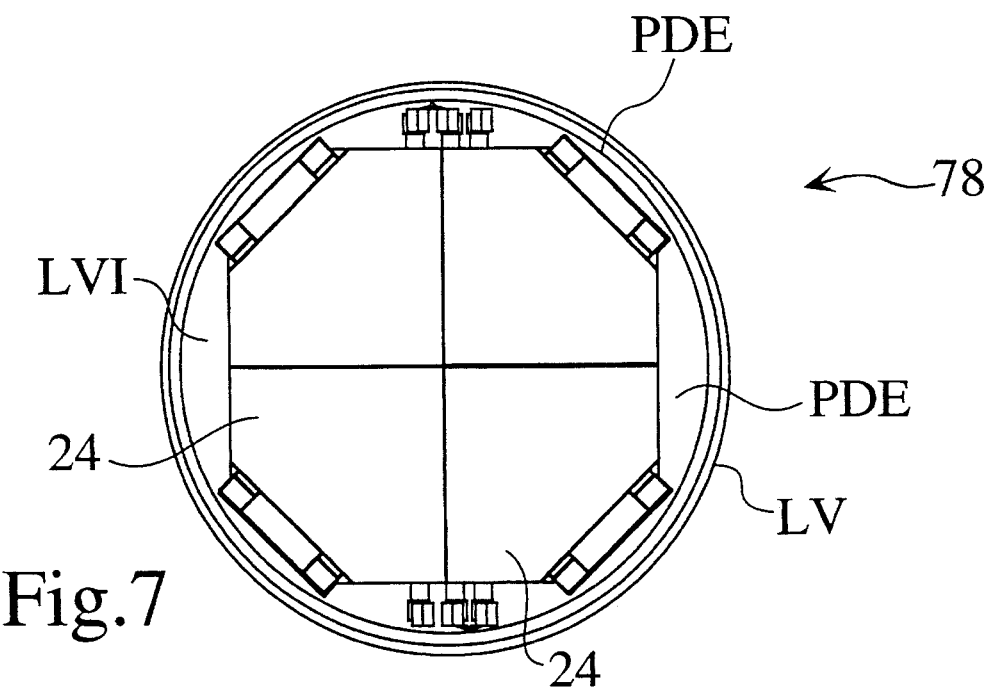
FIG. 7 is a bottom view of a Callingsat within a launch vehicle.

FIG. 5 is a front view 70 of an assembled Callingsat 10 before being placed into a launch vehicle LV. After a final inspection, the Callingsat 10 is placed in the payload dynamic envelope PDE within the interior LVI of the launch vehicle LV, as seen in the cutaway top view 74 illustrated in FIG. 6. FIG. 7 provides a bottom cutaway view 78 of a Callingsat 10 stored within the payload dynamic envelope PDE in the launch vehicle LV. This view shows how the geometric design for the antenna facet panels 24 is chosen to supply a large amount of surface area for placement of antennas 18, while simultaneously providing an extremely compact folded structure.

Figure 8:
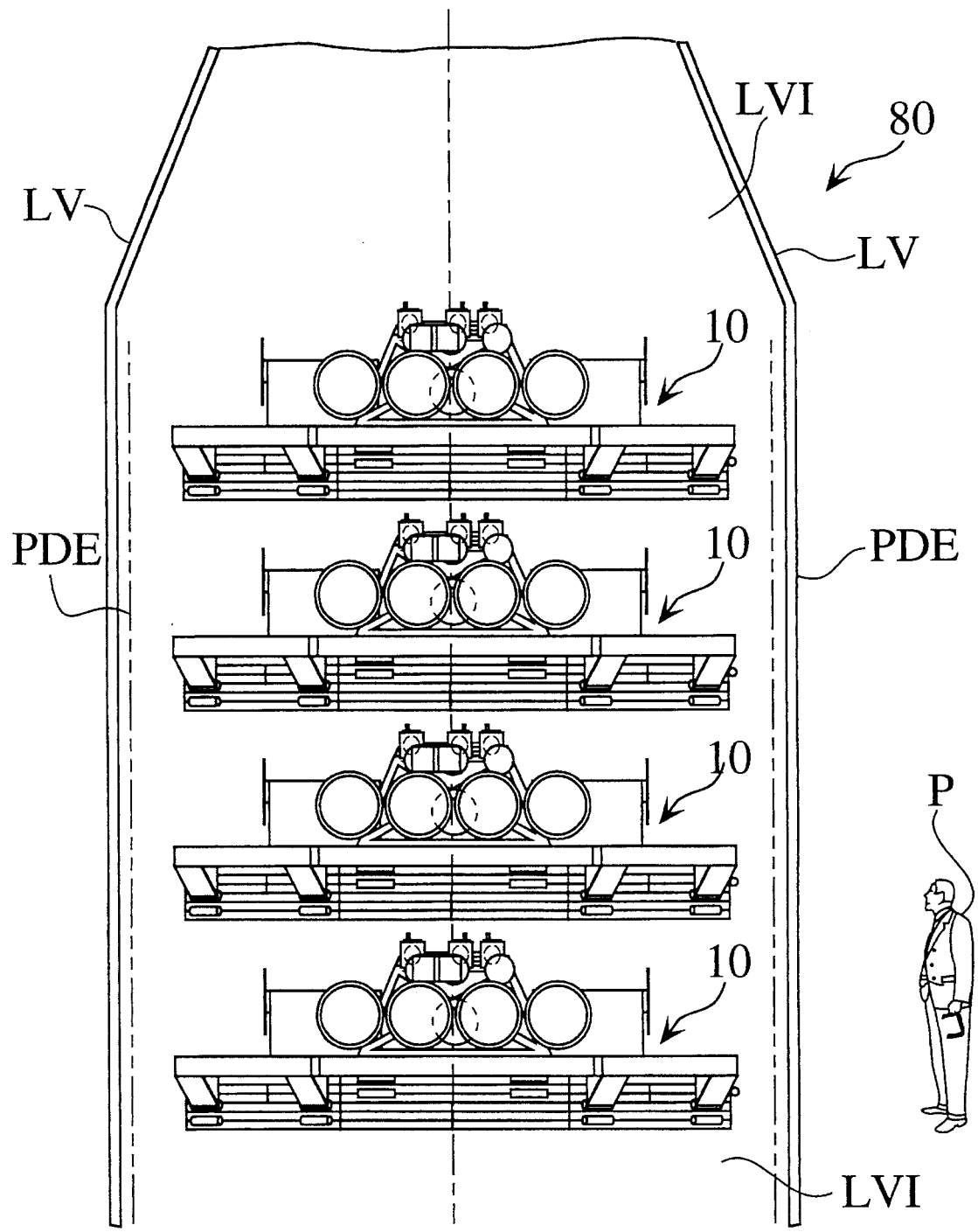
FIG. 8 is a side cutaway view of a launch vehicle with a payload of Callingsats.

FIG. 8 provides a side cutaway view 80 of a launch vehicle LV with a payload of Callingsats 10. A number of Callingsats 10 are located within the payload dynamic envelope PDE area of the interior LVI of the launch vehicle LV. The advanced design techniques employed by the present invention allow a large quantity of Callingsats 10 to be placed within the payload dynamic envelope PDE, which insures that each Callingsat 10 is deployed at minimum cost. To provide a sense of scale, a person P approximately two meters tall is shown standing near the launch vehicle LV before it is launched.

Figure 9:
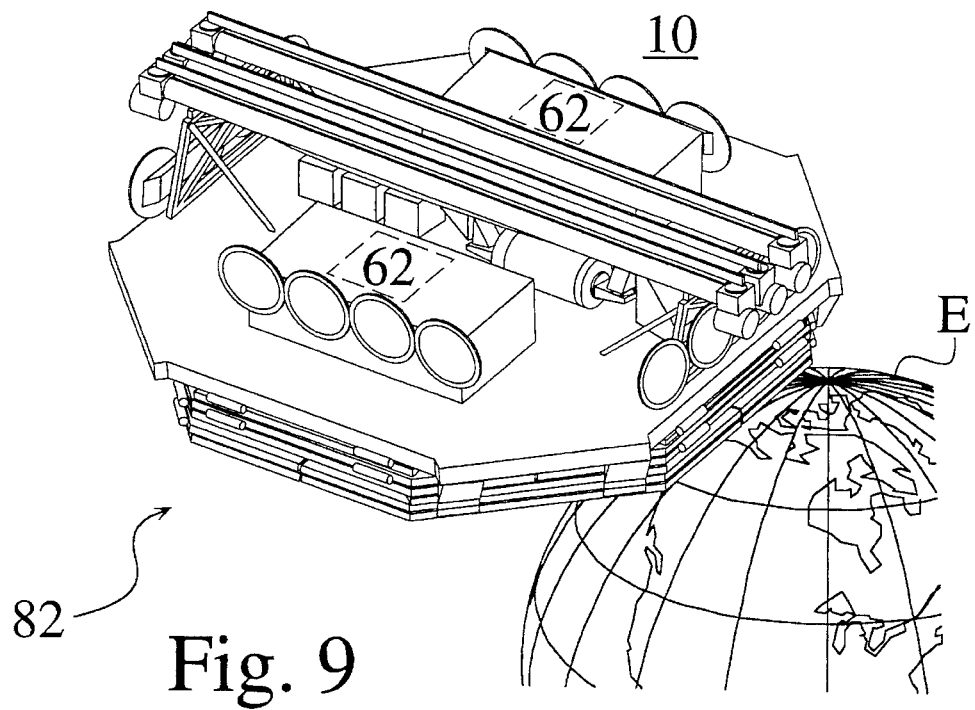
FIG. 9 is an illustration of a Callingsat deployed in low Earth orbit.

FIG. 9 is an illustration 82 of a Callingsat 10 being deployed into a low Earth orbit, after it has been launched from the launch vehicle LV. The launch vehicle LV is capable of deploying Callingsats 10 either one at a time or in multiple groups. The attitude/orbit determination and control subsystem 62 located within the Callingsat 10 determines its current location, and compares it with the intended orbit location above the Earth. The attitude/orbit determination and control subsystem 62 then provides the control logic necessary to activate the pulse plasma thrusters 44 to guide the spacecraft 10 into its correct orbit location.

Figure 10:
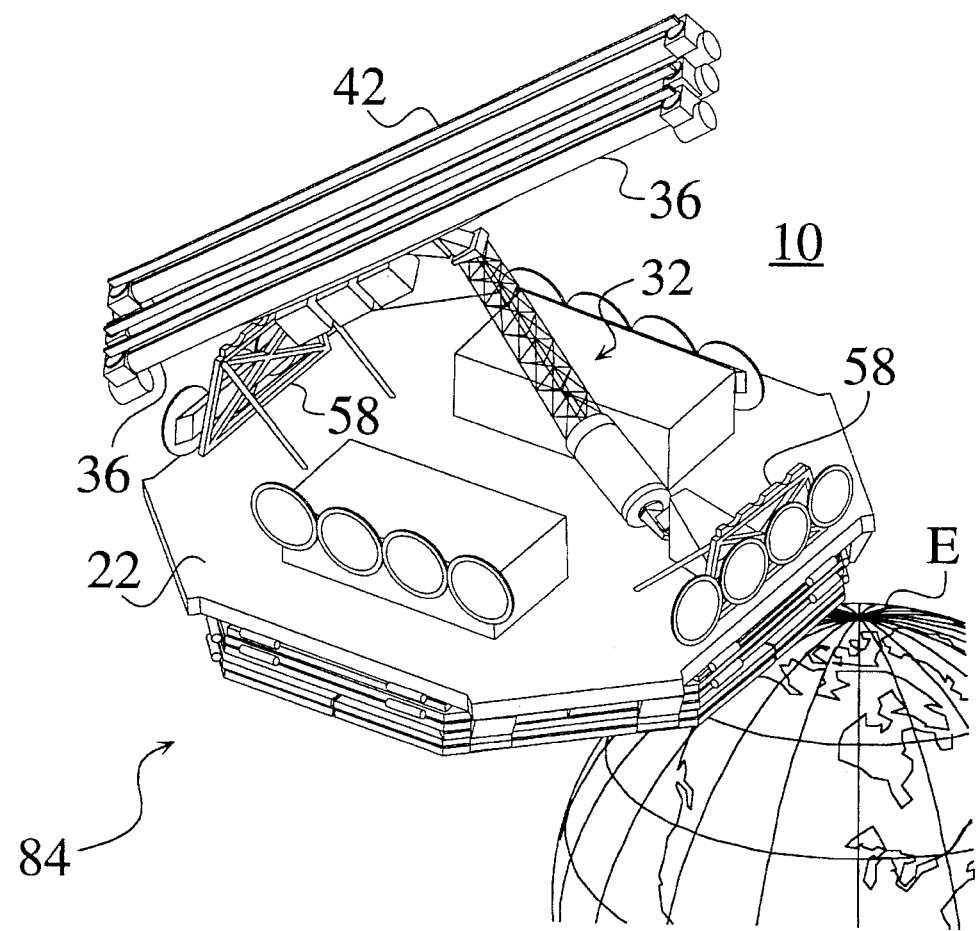
FIG. 10 is an illustration of a deployed Callingsat that depicts how the solar array storage booms would first detach from the rest of the satellite.

As the guided Callingsat 10 approaches correct orbit location above the Earth E, the attitude/orbit determination and control subsystem 62 provides the logic necessary to begin deployment of the Astromast™ boom 32 and the solar array storage booms 36. FIG. 10 is an illustration 84 that shows how the solar array storage booms 36 are disconnected from the solar array attachment structures 58, using spring-loaded, pyrotechnic, or other suitable means to promote detachment. Upon detachment, the Astromast™ boom 32 rotates axially about its couplings with the primary bus structure 22 and the boom crossmast 34, while simultaneously expanding lengthwise to move the solar array storage booms 36 away from the primary bus structure 22.

Figure 11:
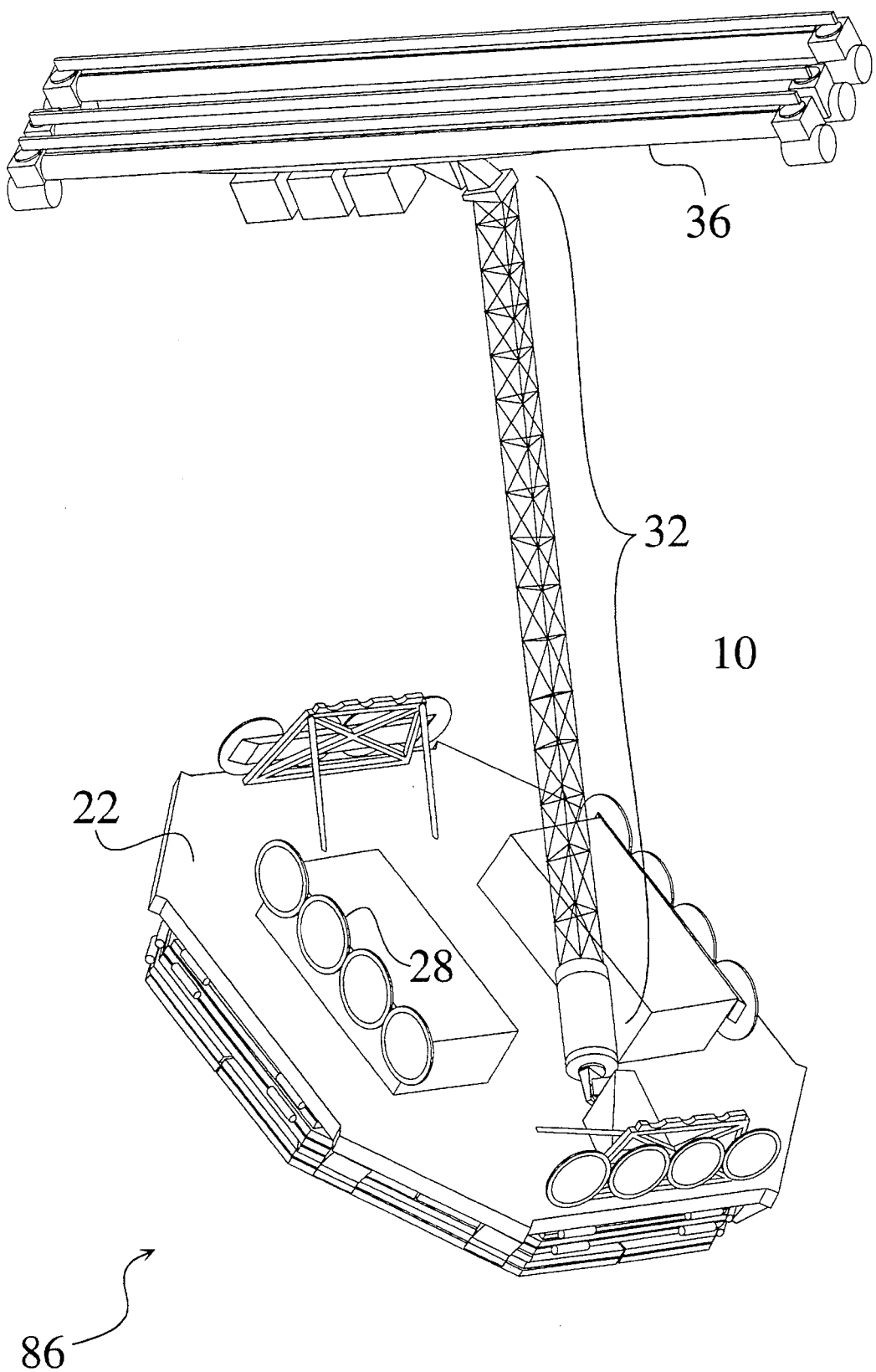
FIG. 11 shows an illustration of a deployed Callingsat with an extending Astromast™ boom.

FIG. 11 provides a view 86 of a deployed Callingsat 10 in which the Astromast™ boom 32 has expanded to distance the solar array storage booms 36 from the primary bus structure 22. The attitude/orbit determination and control subsystem 62 provides the adjustment for pitch and roll reaction to the inertial moment created by the distance of the solar array storage booms 36 from the primary bus structure 22.

The Astromast™ boom 32 continues to extend to its full length. The satellite antennas and electronics operate most efficiently at low temperatures. They can most effectively dissipate the heat generated in their operation by radiating this heat via the back side of the M/FTSL antenna panel sets 20 into "cold space" which has an ambient temperature of approximately 4 degrees Kelvin. If the radiation of the suns is allowed to impinge directly on the back surface of the M/FTSL antenna panel sets, this increases the effective ambient temperature, which would result in less efficient thermal dissipation, a higher operating temperature, and less efficiency. The present design uses the amorphous silicon solar arrays 38 as a sun shade to effectively shield the Callingsat 10 from the sun and thus to reduce the effective ambient temperature of the space into which the Callingsat 10 dissipates heat. This is done by using amorphous silicon solar arrays 38 that when fully extended on the Astromast™ boom 32 between the Callingsat 10 and the suns and oriented perpendicular to the suns, casts a shadow that completely covers the Callingsat 10, including all antenna facet panels 24. The amorphous silicon solar array position that provides maximum shading also provides the most efficient solar energy generation, since the array surface is maintained perpendicular to the sun's rays. The extension of the Astromast™ boom 32 provides sufficient distance between the primary bus structure 22 and the amorphous silicon solar arrays 38, which, in turn, furnishes the required radiation shielding for the antennas 18 and the ISL antennas 28. In this embodiment, the Astromast™ boom 32 is approximately twelve meters long when fully extended.

Figure 12:
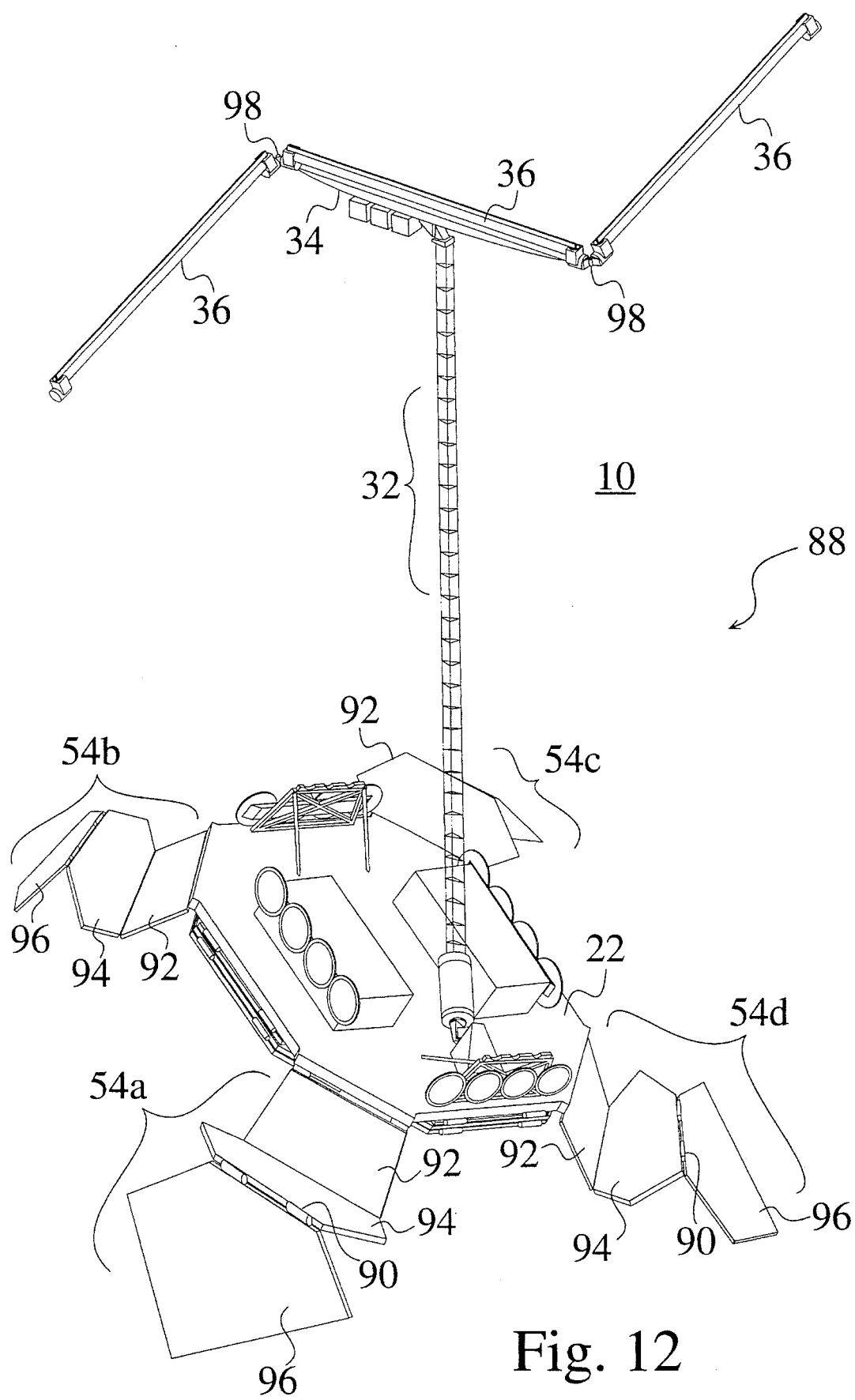
FIG. 12 depicts the expansion of the solar array storage booms and the extension of the outer antenna arrays during deployment of the Callingsat in low Earth orbit.

FIG. 12 is a illustration 88 which depicts the extension of the outer antenna arrays 54. The outer antenna arrays 54 are made up of four outer antenna arrays 54a, 54b, 54c, and 54d. They are located at four opposing corners of the primary bus structure 22. The outer antenna arrays 54 are each made up of an inner antenna panel 92, a central antenna panel 94, and an outer antenna panel 96. Each outer antenna panel 96 coupled in series to a pair of antenna deployment hinges 90, a central antenna panel 94, another pair of antenna deployment hinges 90, an inner antenna panel 92, another pair of antenna deployment hinges 90, and to the primary bus structure 22. When the outer antennas 54 are expanded, the outer antenna panels 96, the central antenna panels 94, and the inner antenna panels 92 are all unfolded, using the antenna deployment hinges 90.

FIG. 12 also illustrates the expansion of the solar array storage booms 36 as the Astromast™ boom 32 reaches its fully extended length. The solar array storage booms 36 are coupled to each other using boom hinge mechanisms 98. The solar array storage booms 36 use the boom hinge mechanisms 98 to pivot away from their parallel stored position towards a coaxial arrangement.

Figure 13:
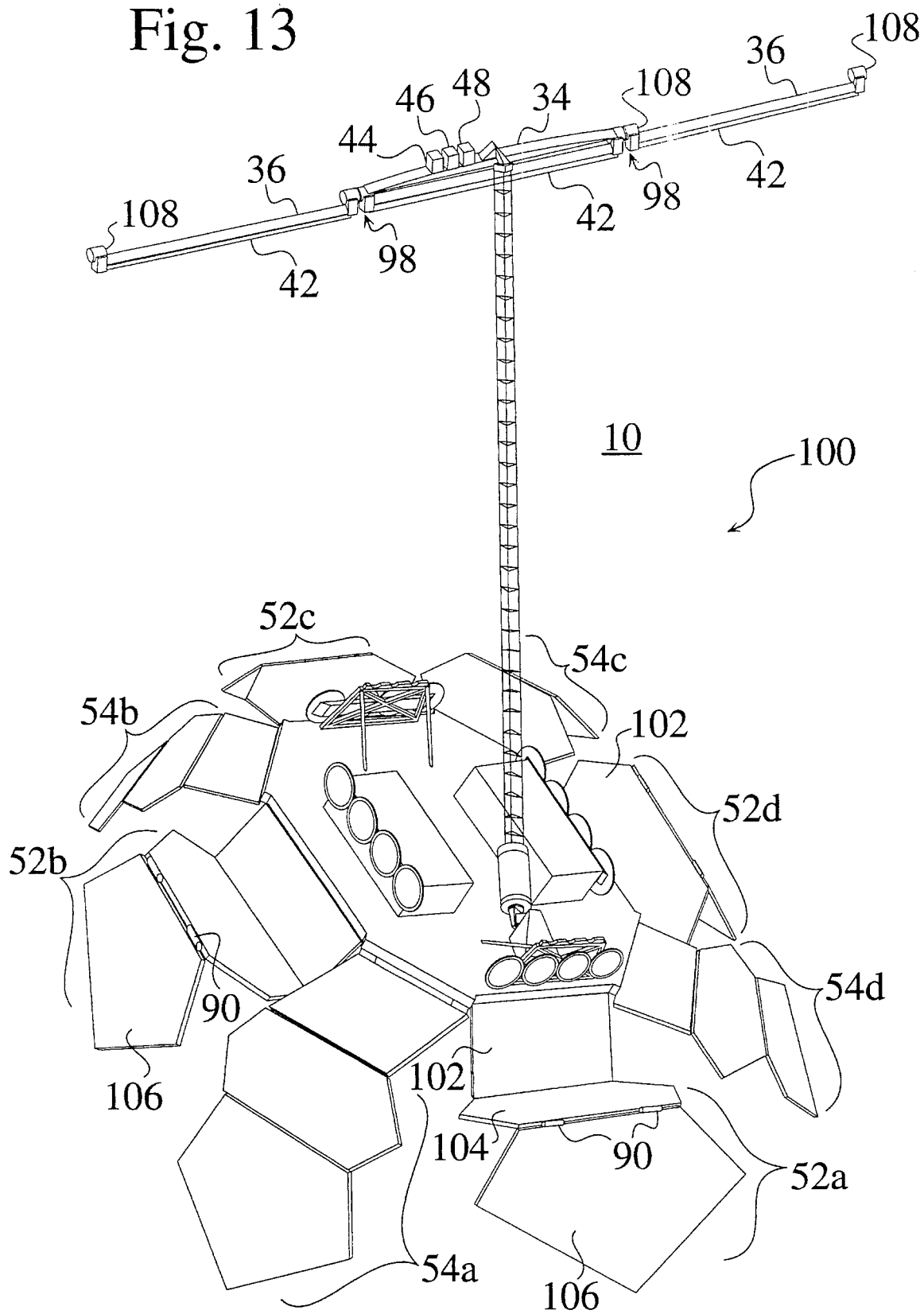
FIG. 13 shows the fully extended solar array storage booms and extension of the inner antenna arrays.

FIG. 13 is an illustration 100 which shows full extension solar array storage booms 36 and the outer antenna arrays 54. The solar array storage booms 36 come into coaxial alignment with each other as the boom hinge mechanisms 98 that couple them pivot to their extended positions. Each end of each solar array storage boom 36 is coupled to a deployment mechanism 108. In FIG. 13 the cantilever booms 42 can be seen as they would be attached to the solar array storage booms 36 in a parallel fashion between the deployment mechanisms 108. The boom crossmast 34 rotates to position the solar array storage booms 38 correctly for expansion of the amorphous silicon solar arrays 36. The pulse plasma thrusters 44, the storage batteries 46, and the shunt regulators 48 are seen as they are located on the boom crossmast 34.

As the outer antenna arrays 54a, 54b, 54c, and 54d continue to unfold away from the primary bus structure 22, they begin to resemble the petals of an oblate flower. The outer antenna array sets 54 are locked in place when the antenna deployment hinges 90 reach the end of their designed travel.

FIG. 13 also illustrates how the inner antenna arrays 52 begin to unfold as the outer antenna arrays 54 expand away from the primary bus structure 22. The inner antenna arrays 52 are made up of four inner antenna arrays 52a, 52b, 52c, and 52d located at four opposing corners of the primary bus structure 22, in between each of the outer antenna arrays 54. The inner antenna arrays 52 are each made up of an inside antenna panel 102, a middle antenna panel 104, and an outside antenna panel 106. Each outside antenna panel 106 is coupled in series to a pair of antenna deployment hinges 90, a middle antenna panel 104, another pair of antenna deployment hinges 90, an inside antenna panel 102, another pair of antenna deployment hinges 90, and to the primary bus structure 22. The inside antenna panels 102 are attached to the primary bus structure 22 at a different offset distance than the inner antenna panels 92 of the outer antenna arrays 54. This offset allows the inner antenna arrays 52 and the outer antenna arrays 54 to be advantageously stored in a minimum volume.

The expansion of the inner antenna arrays 52 is similar to the expansion of the outer antenna arrays 54, and entails the unfolding of the outside antenna panels 106, the middle antenna panels 104, and the inside antenna panels 102 using the antenna deployment hinges 90. The large surface area provided by the inner antenna arrays 52 and the outer antenna arrays 54 provides adequate room for the numerous antennas 18 that make up the Earth-facing antenna array 12, which is designed for large communications traffic within the *Satellite Communications System*.

Figure 14:
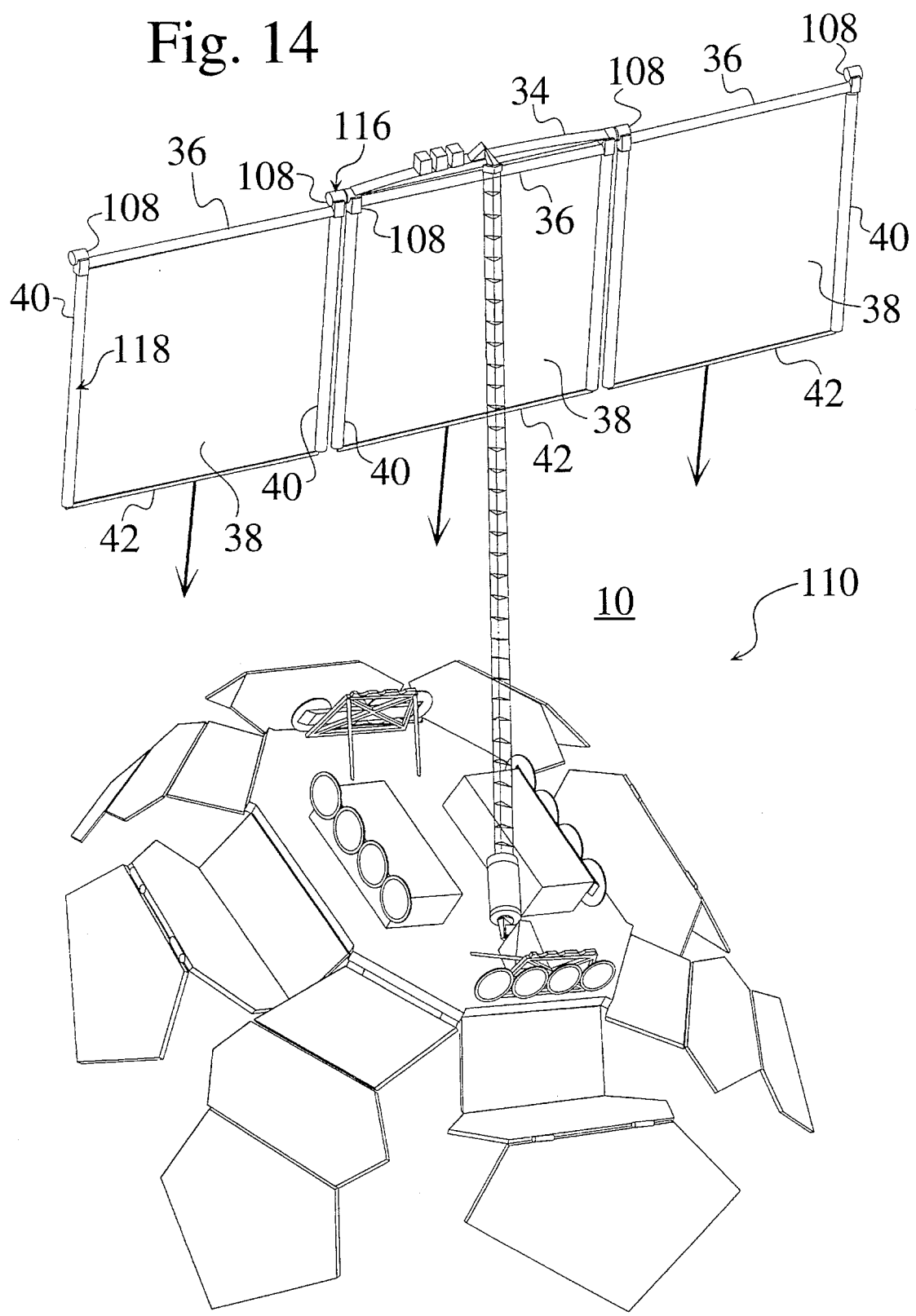
FIG. 14 illustrates the inflation and expansion of solar arrays from the solar array storage booms.

FIG. 14 is an illustration 110 of the inflation and expansion of the amorphous silicon solar arrays 38 from the solar array storage booms 36. The specialized structure of the amorphous silicon solar arrays 38 and the inflatable booms 40 enable the large, extremely light weight, amorphous silicon solar arrays 38 to be deployed from the Callingsat 10 economically and reliably.

The amorphous silicon solar arrays 38 comprise of photovoltaic cells 112 located on a thin film substrate 114. New polymer films, such as Mylar™ or Kapton™ are used for the film substrate 114, which is attached to the photovoltaic cells 112. Mylar™ and Kapton™ satisfy all the material requirements of the film substrate 114, and offer a useful lifetime of many years in outer space.

The inflatable booms 40 attached to the amorphous silicon solar arrays 38 are expanded by gas pressure provided by inflation gas 118 from within the deployment mechanisms 108. The inflatable booms 40 expand away from the deployment mechanisms 108, and are used to unfurl the amorphous silicon solar arrays 38 from their stored positions within the solar array storage booms 36. In one embodiment, the inflatable booms 40 have pleated, "accordion bellows" style structures. In another embodiment, the inflatable booms 40 roll out to unfurl the amorphous silicon solar arrays 38, in a similar fashion to a child's party favor. The inflatable booms 40 provide an extremely effective, light weight means for supporting the light and flexible amorphous silicon solar arrays 38.

Once the inflatable booms 40 are fully inflated to unfurl the amorphous silicon solar arrays 38, they are then rigidized to retain their inflated structure. A small amount of photocurable chemical vapor 116 is deposited into the inflatable booms 40 from within the deployment mechanism 108. The photocurable chemical vapor 116 mixes with the inflation gas 118, and cures on the inner surface of the inflatable booms 40 when it is exposed to ultraviolet radiation provided by the Sun S. As the photocurable chemical vapor 116 cures, it forms a rigid surface on the inner walls of the inflatable booms 40. The rigid inflatable booms 40 then act together with the solar array storage booms 36 and the cantilever booms 42 to provide a long lasting ultralight-weight framework for the amorphous silicon solar arrays 38.

Other embodiments of the present invention employ different techniques to provide an efficient framework for the amorphous silicon solar arrays 38. In one embodiment, continuous gas pressure is provided to provide sufficient rigidity for the inflatable booms 40. In another embodiment, the amorphous silicon solar arrays 38 and inflatable booms 40 are combined to form an inflatable pillow-like structure that can be rigidized with photocurable chemical vapor 116.

Figure 15:
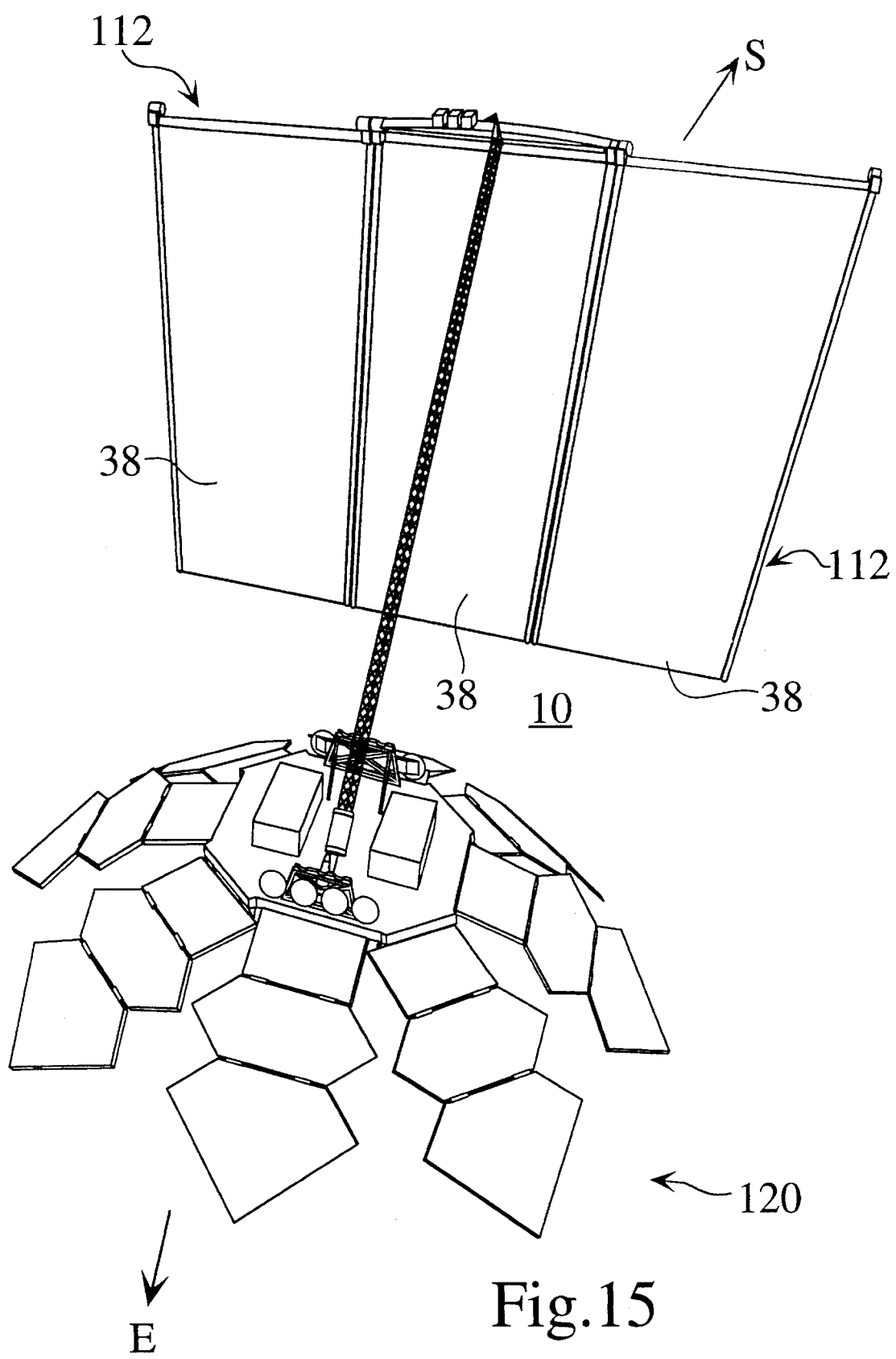
FIG. 15 provides a perspective view of the fully deployed solar arrays on the Callingsat.

FIG. 15 provides a perspective view 120 of the fully deployed amorphous silicon solar arrays 38 on the Callingsat 10. The amorphous silicon solar arrays 38 provide power for the spacecraft 10 through the photovoltaic cells 112. The photovoltaic energy is produced directly from incoming solar energy when photons are absorbed in the semiconductor substrate photovoltaic cells 112. Amorphous silicon is used in the preferred embodiment, since its irregular, noncrystalline arrangement allows highly efficient light absorption in an ultra-thin film. This amorphous silicon film is very lightweight, and is flexible, reliable, and extremely resistant to physical abuse. Excess power provided by the photovoltaic cells 112 is stored in the storage batteries 46. The amorphous silicon solar arrays 38 also function as a solar heat shield for the Callingsat 10, and provide an extremely lightweight and effective active thermal control device.

Many components in an orbiting satellite function properly only if they are maintained within a rather narrow temperature range. The temperatures of satellite components are influenced by the net thermal energy exchange between the satellite and its thermal environment, which is influenced by the magnitude and distribution of radiation input from the Sun S and the Earth E.

The objective of satellite thermal control design is to provide the proper heat transfer between all satellite elements so that temperature sensitive components remain within their specified temperature limits. Techniques used for satellite thermal control can be passive or active. Passive techniques include thermal coatings, thermal insulation and heat sinks. Active thermal control techniques include heat pipes, louvers, heat shields, and electrical heaters.

A satellite heat pipe is a thermal device that can provide a significant transfer of thermal energy between to regions on the satellite. A heat pipe comprises a closed cylinder whose inner surfaces are lined with a wick that provides a capillary effect. Heat in the warm portion of the pipe vaporizes a working fluid. The resulting pressure difference drive the vapor to the cooler end of the tube, where the vapor condenses and releases its latent heat of vaporization. The loss of liquid in the warmer area creates a capillary pressure that promotes movement of liquid from the cooler region to the warmer region, thus creating the continuous cycle required for heat transfer.

Figure 16:
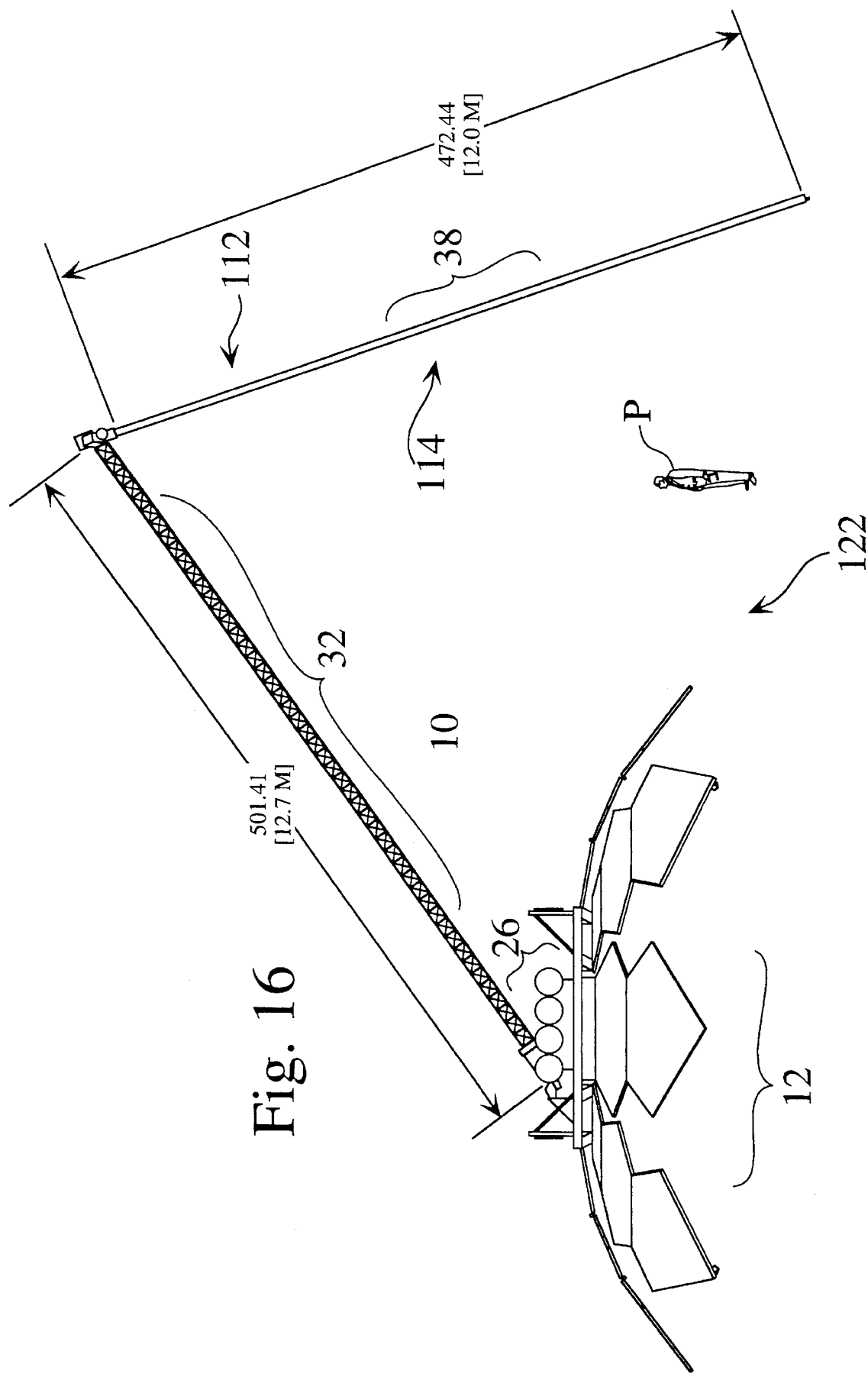
FIG. 16 is a side view of a fully extended and deployed Callingsat.

FIG. 16 is a side view 122 of a fully extended and deployed Callingsat 10. This depiction shows how the advanced design of the Callingsat 10 provides a large Earth-facing antenna array 12 to provide a large volume of 30 GHz uplinks 14 and 20 GHz downlinks 16, and ISL antenna arrays 26 to provide a large volume of 60 GHz intersatellite links 30. This view also illustrates how the expandable Astromast™ boom 32 is extended to position the amorphous silicon solar arrays 38 correctly.

Figure 17:
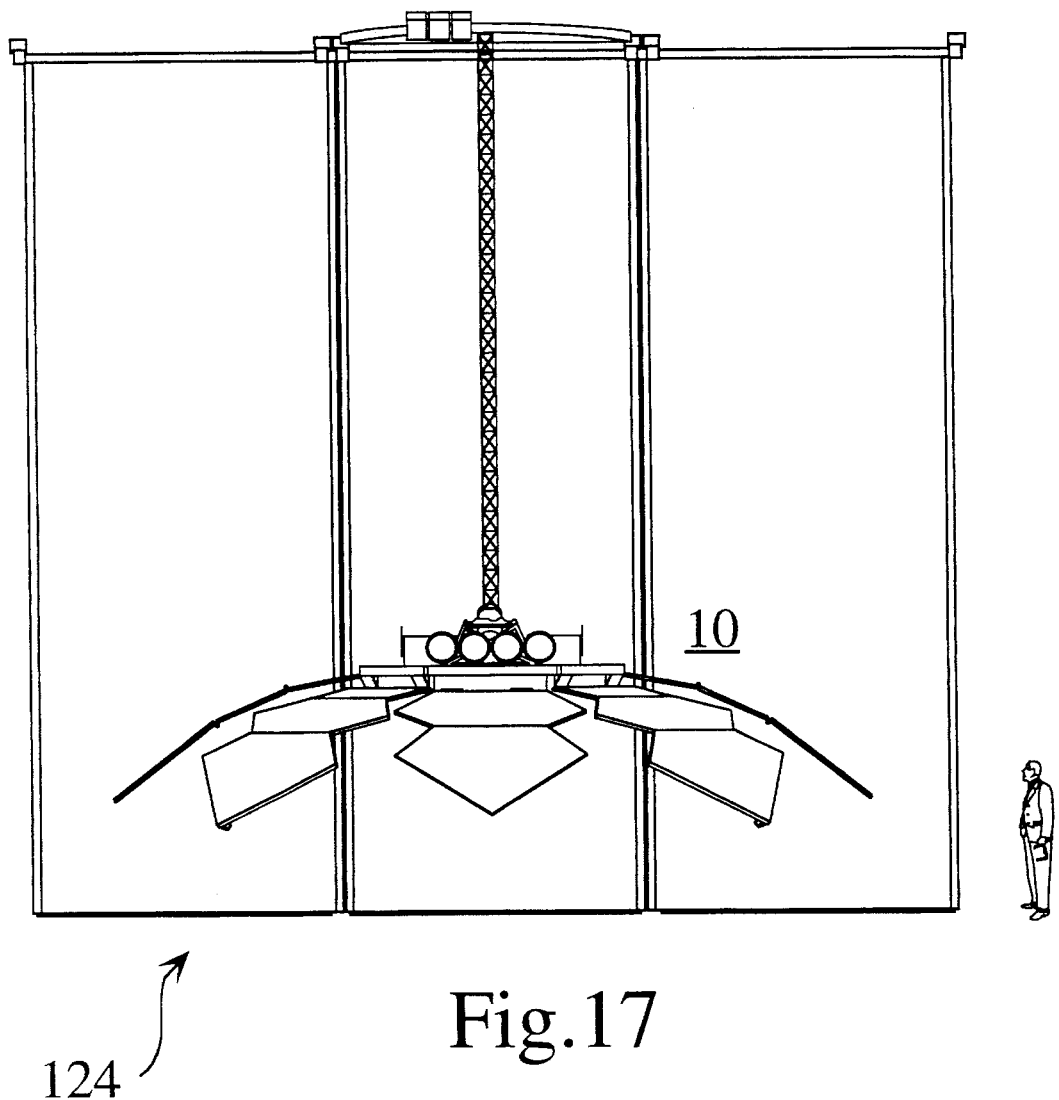
FIG. 17 is a front view of fully deployed Callingsat.

FIG. 17 is a from view 124 of a fully deployed Callingsat 10. This view portrays the large amorphous silicon solar arrays 38 and shows how they provide thermal heat shielding for the Callingsat 10. The amorphous silicon solar arrays 38 supply a large surface area of photovoltaic cells 112 which collect solar radiation and provide power for the Callingsat 10.

Figure 18:
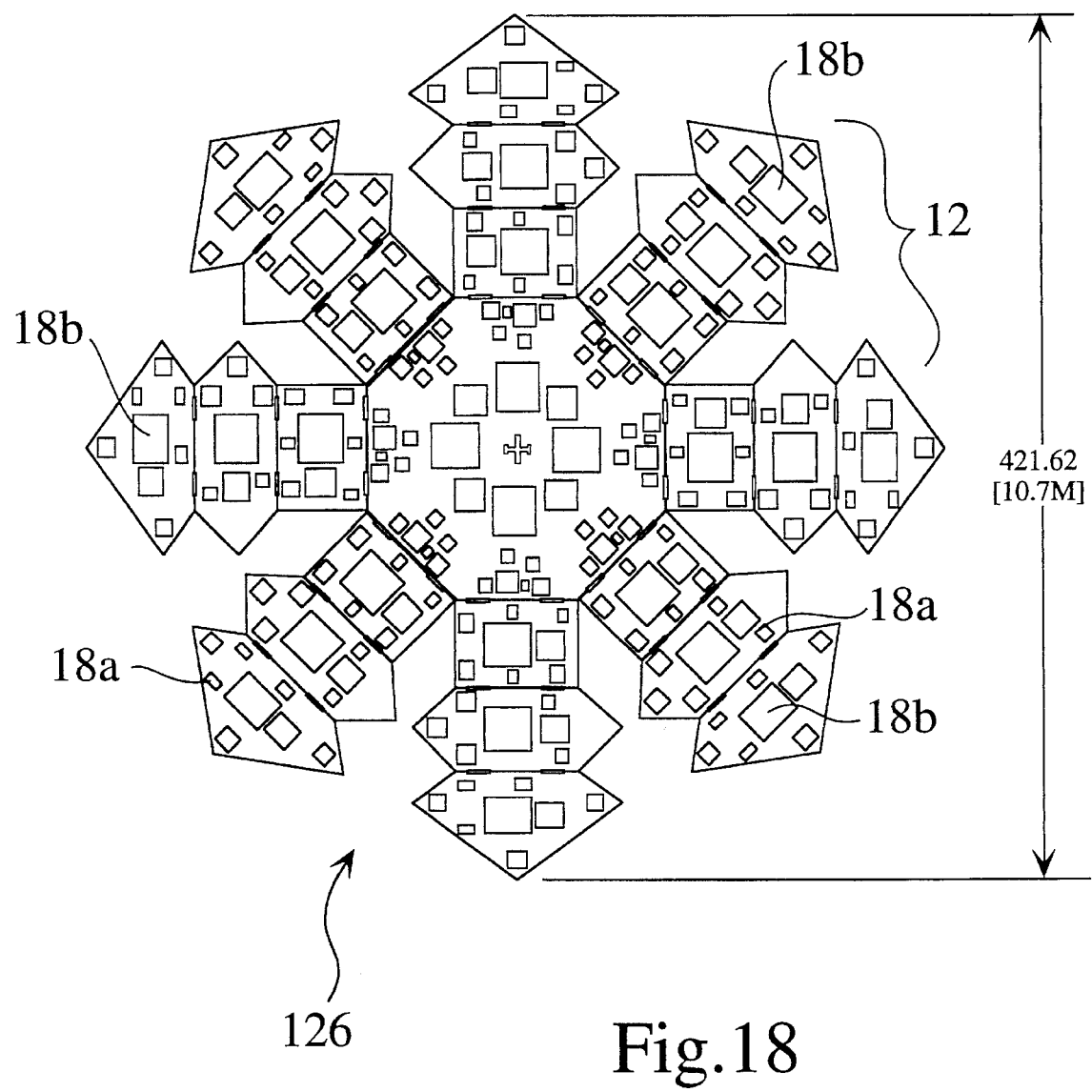
FIG. 18 is an illustration of the fully deployed Earth-facing antenna array used in the present invention.

FIG. 18 is an illustration 126 of the fully deployed Earth-facing antenna array 12 used in the present invention. The antennas 18 located on the inner antenna arrays 52, the outer antenna arrays 54, and the primary bus structure 22 consist of uplink antennas 18a and downlink antennas 18b. The uplink antennas 18a are used to receive 30 GHz uplinks 14, and the downlink antennas 18b are used to transmit 20 GHz downlinks 16.

Figure 19:
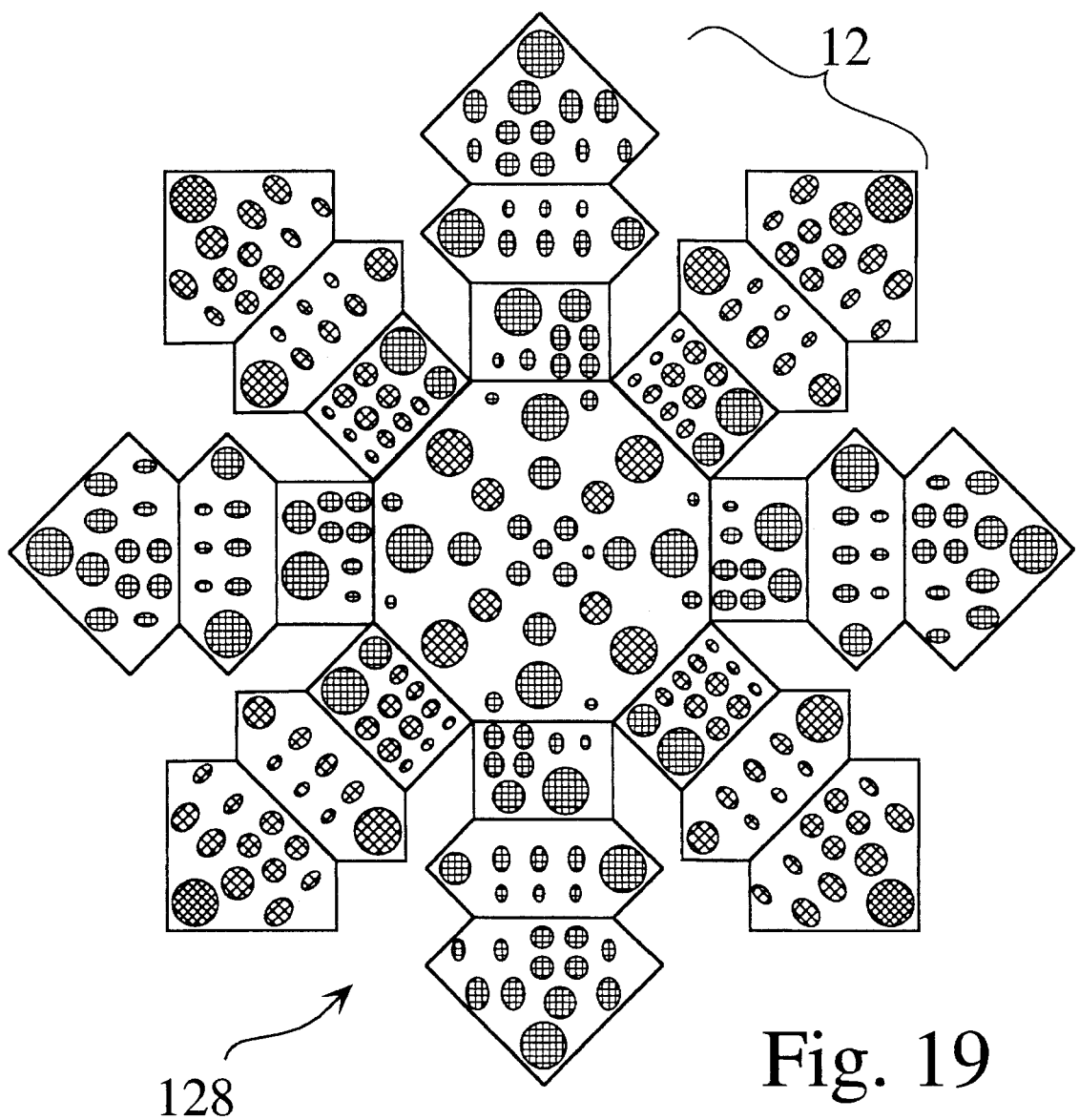
FIG. 19 is an alternate embodiment of the Earth-facing antenna arrays.
Figure 20:
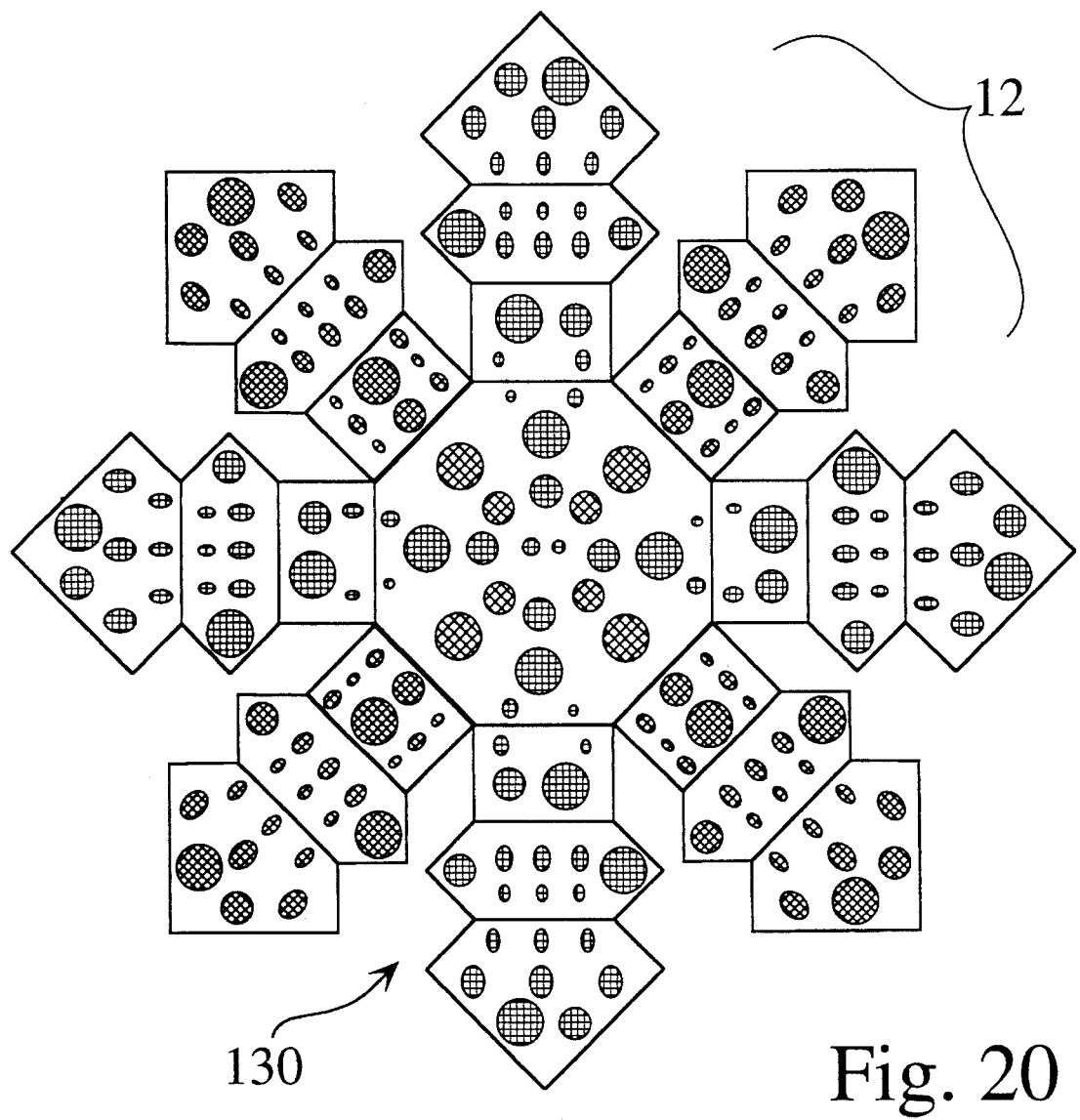
FIG. 20 provides another alternate embodiment for the Earth-facing antenna arrays.

FIG. 19 is an alternate embodiment 128 of the Earth-facing antenna array 12. This embodiment features a different arrangement of uplink antennas 18a and downlink antennas 18b that are located on the inner antenna arrays 52, the outer antenna arrays 54, and the primary bus structure 22. FIG. 20 illustrates another embodiment 130 for the Earth-facing antenna array 12. The pattern shown in FIG. 20 utilizes uplink antennas 18a and downlink antennas 18b that reside on the inner antenna arrays 52, the outer antenna arrays 54, and the primary bus structure 22.

Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE CHARACTERS

10 Callingsat satellite
12 Earth-facing antenna array
14 30 Ghz uplinks
16 20 GHz downlinks
18 Antennas
18a Uplink antennas
18b Downlink antennas
20 M/FTSL antenna panel set
22 Primary bus structure
24 Antenna facet panels
26 ISL antenna array
28 Individual ISL antenna
30 60 GHz intersatellite links
32 Astromast™ boom
34 Boom crossmast
36 Solar array storage boom
38 Amorphous silicon solar array
40 Inflatable boom
42 Cantilever boom
44 Pulse plasma thrusters
46 Storage batteries
48 Shunt regulators
50 Perspective view of assembled Callingsat
52 Inner antenna array
52A First inner antenna array
52B Second inner antenna array
52C Third inner antenna array
52D Fourth inner antenna array
54 Outer antenna array
54A First outer antenna array
54B Second outer antenna array
54C Third outer antenna array
54D Fourth outer antenna array
56 Component storage compartment
58 Solar array attachment structure
60 Command and data handling subsystem
62 Attitude/orbit determination and control subsystem
64 Communications payload subsystem
66 Front view of assembled Callingsat
68 Side view of assembled Callingsat
70 Front view of Callingsat before launch
74 Top cutaway view of Callingsat in launch vehicle
80 Bottom cutaway view of Callingsat within launch vehicle
82 Illustration of Callingsat deployed in low Earth orbit
84 Illustration of deployed Callingsat with detached solar array storage booms
86 Illustration of deployed Callingsat with extended Astromast™ boom
88 Depiction of expanding solar array boom and extension of outer antenna arrays
90 Antenna deployment hinges
92 Inner antenna panel on outer array
94 Central antenna panel on outer array
96 Outer antenna panel on outer array
98 Boom hinge mechanism
100 Depiction of extended solar array boom and extension of inner antenna arrays
102 Inside antenna panel on inner array
104 Middle antenna panel on inner array
106 Outside antenna panel on inner array
108 Deployment mechanism
110 Depiction of inflating solar arrays
112 Photovoltaic cells
114 Film substrate
116 Photocurable chemical vapor
118 Inflation gas
120 Fully deployed solar array
122 Side view of fully deployed Callingsat
124 Front view of fully deployed Callingsat
126 Illustration of fully deployed earth-facing antenna arrays 128 Alternate embodiment of earth facing antenna arrays
130 Another embodiment of earth facing antenna arrays
E Earth
P Person
LV Launch vehicle
LVI Launch vehicle interior
PDE Payload dynamic envelope
S Sun

What is claimed is:

1. A satellite apparatus (10) capable of being placed in a low Earth orbit using a launch vehicle (LV) for providing communications among a plurality of portable, mobile, and fixed terminals and among other of said satellite apparatus comprising:

an Earth-facing antenna array (12);
   said Earth-facing antenna array (12) including a plurality of substantially polygonal, planar antenna panels (92, 94, 96, 102, 104, & 106);
   said plurality of substantially polygonal, planar antenna panels (92, 94, 96, 102, 104, & 106) being maintained in an orbital orientation which aims said plurality of substantially polygonal, planar antenna panels (92, 94, 96, 102, 104, & 106) generally towards the Earth;
   a plurality of hinge elements (90); said plurality of hinge elements (90) being used to mechanically couple said plurality of substantially polygonal, planar antenna panels (92, 94, 96, 102, 104, & 106);
   said antenna array (12) being capable of being stowed in a coaxially nested arrangement with other of said antenna arrays (12) for transportation in said launch vehicle (LV);
a space-facing array (26);
   said space-facing array (26) including a plurality of intersatellite antennas (28); each of said plurality of intersatellite antennas (28) capable of being maintained in an orbital orientation which aims said intersatellite antennas (28) generally tangential to surface of the Earth;
a solar array (38) for supplying power to said Earth-facing antenna array (12);
   said solar array (38) being capable of being stored substantially near said Earth-facing antenna array (12);
   said solar array (38) being capable of being deployed away from said Earth-facing antenna array (12) and unfurled to a fully extended position (120);
   said solar array (38) including a layer of photovoltaic cells (112);
   said solar array (38) being movably connected to said Earth-facing antenna array (12);
   said solar array (38) being capable of being rotated independently about a plurality of axes to optimize the collection of solar radiation; and
   said solar array (38) being capable of being positioned to provide shielding of solar radiation from said Earth-facing antenna array (12).

2. A method of operating a communications system; said communications system being capable of communicating among a plurality of portable, mobile, and fixed terminals comprising the steps of:

placing a plurality of satellites (10) into a low Earth orbit using a launch vehicle (LV);
   said plurality of satellites (10) each including an Earth-facing antenna array (12);
   said Earth-facing antenna array (12) including a plurality of substantially polygonal, planar antenna panels (92, 94, 96, 102, 104, & 106);
   said plurality of substantially polygonal, planar antenna panels (92, 94, 96, 102, 104, & 106) being capable of being maintained in an orbital orientation which aims said plurality of substantially polygonal, planar antenna panels (92, 94, 96, 102, 104, & 106) generally towards the Earth;
   said Earth-facing antenna array (12) including a plurality of hinge elements (90);
   said plurality of hinge elements (90) being used to mechanically couple said plurality of substantially polygonal, planar antenna panels (92, 94, 96, 102, 104, & 106);
   said Earth-facing antenna array (12) being capable of being stowed in a coaxially nested arrangement with other of said antenna arrays (12) for transportation in said launch vehicle (LV);
   said plurality of satellites (10) also each including a space-facing array (26);
   said space-facing array (26) including a plurality of intersatellite antennas (28);
   each of said plurality of intersatellite antennas (28) being capable of being maintained in an orbital orientation which aims said intersatellite antennas (28) generally tangential to surface of the Earth;
   said plurality of satellites (10) also each including a solar array (38) for supplying power to said Earth-facing antenna array (12);
   said solar array (38) being capable of being stored substantially near said Earth-facing antenna array (12);
   said solar array (38) being capable of being deployed away from said Earth-facing antenna array (12) and unfurled to a fully extended position (120);
   said solar array (38) including a layer of photovoltaic cells (112);
   said solar array (38) being movably connected to said Earth-facing antenna array (12);
   said solar array (38) being capable of being rotated independently about a plurality of axes to optimize the collection of solar radiation; and
   said solar array (38) being capable of being positioned to provide shielding of solar radiation from said Earth-facing antenna array (12);
deploying said Earth-facing antenna array (12) from its stowed position; and
unfurling said solar array (28) from its stowed to its extended position.

3. A satellite apparatus capable of being placed in low Earth orbit using a launch vehicle (LV) for providing communications among a plurality of portable, mobile, and fixed terminals and among other of said satellite apparatus comprising:

a polygonal satellite bus (22);
   said polygonal satellite bus (22) having an Earth-facing antenna array (12) and an intersatellite link antenna array (26);
a solar array (38) for supplying power to said polygonal satellite bus (22) and said Earth-facing antenna array (12); said solar array (38) movably coupled to said polygonal satellite bus (22);
   said solar array (38) being deployed between the sun and said Earth-facing antenna array (12) in a direction generally perpendicular to rays of the sun (S) and being independently positioned about a plurality of axes and in a direction toward the sun (S) from said satellite bus (22) to optimize the collection of solar radiation and to maintain shielding of said Earth-facing antenna array (12) from solar radiation during any portion of said low Earth orbit.

4. The satellite apparatus as claimed in claim 3 further comprising:

a plurality of solar array panels (38);

a movable, extensible boom (32) for positioning said plurality of solar panels (38) with respect to said solar radiation and said Earth-facing antenna array (12);

a boom crossmast (34) coupled to an end of said movable, extensible boom (32);

a plurality of solar array storage booms (36) for storing each of said solar array panels (38) prior to their deployment; said plurality of solar array storage booms (36) coupled to said boom crossmast (34) and being capable of being extended into a position so the longitudinal axes of said plurality of solar array storage booms (36) are aligned with and supported by said boom crossmast (34);

a plurality of inflatable booms (40) for unfurling said plurality of solar array panels (38) from a stored position in said plurality of solar array storage booms (36); each one of said plurality of inflatable booms (40) having a longitudinal axis; each one of said plurality of inflatable booms (40) being coupled at a first end along said longitudinal axis to an end of one of said solar array storage booms (36); said longitudinal axis being oriented perpendicularly to a longitudinal axis of a solar array storage boom (36) to which it is coupled;

a plurality of cantilever booms (42); each of said plurality of cantilever booms (42) being coupled at a second end of, and between two of said plurality of inflatable booms (40) to create a plane polygon framework, formed by one of said plurality of solar panel storage booms (36), a pair of said plurality of inflatable booms (40) and one of said plurality of cantilever booms (42), to which one of said plurality of solar panels (38) is attached;

a solar array attachment structure (58) anchored to said polygonal satellite bus (22); said solar array attachment structure (58) being coupled to said movable, extensible boom (32) in a manner which permits rotation about each axis of its couplings by said movable, extensible boom (32); and a deployment mechanism (108) having an inflation gas (118) under pressure;

said plurality of inflatable booms (40) being extended by introduction of said inflation gas (118) under pressure to deploy said plurality of solar array panels (38) which remain deployed at the end of said movable, extensible boom (32), remote from said Earth-facing antenna array (12) and said intersatellite link antenna array (26);

said solar array (38), when oriented perpendicular to rays of the sun (S), casts a shadow that substantially covers said Earth-facing antenna array (12) and said intersatellite link antenna array (26), shielding said antenna arrays (12, 26) from solar radiation.

5. The satellite apparatus as claimed in claim 3 in which said Earth-facing antenna array (12) further comprises:

a plurality of sets of antenna panels (20), each of said sets of antenna panels (20) having a plurality of antenna facet panels (24);

a plurality of individual, electronically steered, phased array antennas (18);

said individual, electronically steered, phased array antennas (18) located on Earth-facing surfaces of said antenna facet panels (24);

a plurality of antenna deployment hinges (90);

each one of said plurality of deployment hinges (90) coupling one of said plurality of antenna facets (24) to another of said antenna facets (24) in each one of said sets of antenna panels (52, 54);

each one of said sets of antenna panels (20) coupled to said polygonal satellite bus (22) at adjacent sides by one of said deployment hinges (90) at an offset distance from a surface of said satellite bus (22) which permits compact folding of said sets of inner antenna panels (20) for storage in a launch vehicle (LV);

each one of said plurality of antenna facets (24) being individually deployed and locked into place at an angle with respect to Earth's surface that limits a required steering angle from said satellite apparatus (10) to a portion of Earth's surface served by said antenna facet (24), by action of said antenna deployment hinge (90) coupled thereto.

6. The satellite apparatus as claimed in claim 3, in which said polygonal satellite bus (22) has an octagonal planform.

7. The satellite apparatus as claimed in claim 3, in which said polygonal satellite bus (22) further includes:

an on-board altitude and attitude determination system (62) for determining current satellite location in orbit at any time;

a control system (62) for comparing said current satellite location with an intended orbit location; and a plurality of plasma thrusters (44) controlled by said control system (62) for guiding said satellite apparatus (10) to said intended orbit location.

8. The satellite apparatus as claimed in claim 4, in which said plurality of inflatable booms (40) are made permanently rigid by depositing a photocurable chemical vapor (116) on inner surfaces of said inflatable booms (40) which forms a rigid surface; said photocurable chemical vapor (116) being contained within said deployment mechanism (108), introduced into said inflatable booms (40) when said inflatable booms (40) are fully extended, and cured by exposure to sun light.

9. The satellite apparatus as claimed in claim 4, in which each one of said plurality of solar array panels (38) includes a plurality of photovoltaic cells (112) mounted on a thin film substrate (114).

10. The satellite apparatus as claimed in claim 5, in which said deployment hinges (90) permit compact folding of said sets of antenna panels (20) inward against a bottom surface of said polygonal satellite bus (22) for coaxially-nested storage in said launch vehicle (LV).

11. A method of operating a communications system; said communications system being capable of communicating among a plurality of portable, mobile, and fixed terminals, comprising the steps of:

placing a satellite (10) in low Earth orbit;
said satellite (10) having a polygonal satellite bus (22);
said satellite (10) having an Earth-facing antenna array (12) and an intersatellite link antenna array (26);
said satellite having a solar array (38) movably coupled to said polygonal satellite bus (22);

providing power to said polygonal satellite bus (22), said Earth-facing antenna array (12) and said satellite link antenna array (26) with said solar array (38);

optimizing the collection of solar radiation and maintaining shielding of said Earth-facing antenna array (12) and said intersatellite link array (26) from solar radiation during any portion of said orbit by deploying said solar array (38) between the sun and said Earth-facing antenna array (12) in a direction generally perpendicular to rays of the sun (S) and independently positioning said solar array (38) about a plurality of axes in a direction toward the sun (S) from said polygonal satellite bus (12).

12. The method as claimed in claim 11, further comprising the steps of:

determining current location in orbit of said satellite (10) at any time with an on-board altitude and attitude determination system (62);

comparing said current satellite location with an intended orbit location with a control system (62); and guiding said satellite apparatus (10) to said intended orbit location from said current location with a plurality of plasma thrusters (44) controlled by said control system (62).

13. The method as claimed in claim 11, further comprising the steps of:

providing a plurality of solar array panels (38);

providing a solar array attachment structure (58) anchored to said polygonal satellite bus (22) and coupling said solar array attachment structure (58) to a movable, extensible boom (32) in a manner which permits rotation about each axis of its couplings by said movable, extensible boom (32);

coupling a boom crossmast (34) to an end of said movable, extensible boom (32);

storing each of said solar array panels (38) prior to their deployment in a plurality of solar array storage booms (36); said plurality of solar array storage booms (36) being coupled to said boom crossmast (34);

extending said plurality of solar array storage booms (36) into a position so the longitudinal axes of said plurality of solar array storage booms (36) are aligned with and supported by said boom crossmast (34);

providing a deployment mechanism (108) having an inflation gas (118) under pressure;

providing a plurality of inflatable booms (40);
each one of said plurality of inflatable booms (40) having a longitudinal axis; each one of said plurality of inflatable booms (40) being coupled at a first end along said longitudinal axis to an end of one of said solar array storage booms (36); said longitudinal axis being oriented perpendicularly to a longitudinal axis of a solar array storage boom (36) to which it is coupled;

a cantilever boom (42) being coupled between each two of said plurality of inflatable booms (40) at a second end of each of said plurality of inflatable booms (40) to create a plane polygon framework, formed by one of said plurality of solar panel storage booms (36), a pair of said plurality of inflatable booms (40) and one of said plurality of cantilever booms (42), to which one of said plurality of solar panels (38) is attached;

extending said plurality of inflatable booms (40) and deploying said plurality of solar array panels (38) from stored position by introducing said inflation gas (118) under pressure into said plurality of inflatable booms (40); said solar array panels (38) remaining deployed at the end of said movable, extensible boom (32), remote from said Earth-facing antenna array (12) and said intersatellite link antenna array (26);

positioning said plurality of solar array panels (38) in a direction toward the sun (S) in respect of said satellite bus (12) with said movable, extensible boom (32);

orienting said solar array panels (38) perpendicular to rays of the sun (S) by rotating said movable, extensible boom (32) about each of said axis of its couplings, thereby casting a shadow that completely covers said Earth-facing antenna array (12) and said intersatellite link antenna array (26), and substantially shielding said antenna arrays (12, 26) from solar radiation.

14. The method as claimed in claim 13, further comprising the steps of:

providing a plurality of sets of antenna panels (20), each of said sets of antenna panels (20) having a plurality of antenna facet panels (24);

providing a plurality of individual, electronically steered, phased array antennas (18) located on Earth-facing surfaces of said antenna facet panels (24);

providing a plurality of antenna deployment hinges (90);

coupling one of said plurality of antenna facets (24) to another of said antenna facets (24) in each one of said sets of antenna panels (52, 54); with one of said plurality of deployment hinges (90);

coupling each one of said sets of antenna panels (20) to said polygonal satellite bus (22) at adjacent sides with one of said deployment hinges (90), at an offset distance from a surface of said satellite bus (22) which permits compact folding of said sets of inner antenna panels (20) for storage in said launch vehicle (LV);

deploying each one of said plurality of antenna facets (24) individually;

locking each one of said plurality of antenna facets (24) into place at an angle with respect to Earth's surface that limits a required steering angle from said satellite apparatus (10) to a portion of Earth's surface served by said antenna facet (24), by action of said antenna deployment hinge (90) coupled thereto.

15. The method as claimed in claim 13, further comprising the steps of:

making permanently rigid said plurality of inflatable booms (40) by depositing a photocurable chemical vapor (116) on inner surfaces of said inflatable booms (40) which forms a rigid surface;

said photocurable chemical vapor (116) contained within said deployment mechanism (108), introduced into said inflatable booms (40) when said inflatable booms (40) are fully extended, and cured by exposure to sun light.

16. The method as claimed in claim 13, further comprising the step of: forming each one of said plurality of solar array panels (38) by mounting a plurality of photovoltaic cells (112) on a thin film substrate (114).

17. The method as claimed in claim 14, in which the step of providing a plurality of sets of antenna panels (20) includes compactly folding said sets of antenna panels (20) inwardly against a bottom surface of said polygonal satellite bus (22) to permit coaxially-nested storage in said launch vehicle.

* * * * *

UNITED STATES PATENT AND TRADEMARK OFFICE
CERTIFICATE OF CORRECTION

PATENT NO.      :   5,527,001

DATED           :   June 18, 1996

INVENTOR(S)     :   James R. Stuart

It is certified that error appears in the above-identified patent and that said Letters Patent is hereby corrected as shown below:

Column 6, line 32:   "suns" should be --sun--.

Column 6, line 43:   "suns" should be --sun--.

Column 6, line 44:   "suns" should be --sun's rays--.

Column 9, line 10:   "to" should be --two--.

Column 9, line 15:   "drive" should be --drives--.

Column 9, line 30:   "from" should be --front--.

Signed and Sealed this

Third Day of June, 1997

BRUCE LEHMAN

*Attest:*

*Attesting Officer*                 *Commissioner of Patents and Trademarks*